(12) United States Patent
Teraoka

(10) Patent No.: US 12,025,782 B2
(45) Date of Patent: Jul. 2, 2024

(54) ZOOM LENS

(71) Applicant: AAC Optics (Suzhou) Co., Ltd., Suzhou (CN)

(72) Inventor: Hiroyuki Teraoka, Osaka (JP)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 212 days.

(21) Appl. No.: 17/730,102

(22) Filed: Apr. 26, 2022

(65) Prior Publication Data

US 2022/0413271 A1 Dec. 29, 2022

(30) Foreign Application Priority Data

Mar. 30, 2021 (JP) ................................. 2021-058865

(51) Int. Cl.
*G02B 15/14* (2006.01)
*G02B 9/62* (2006.01)
*G02B 13/00* (2006.01)
*G02B 13/18* (2006.01)
*G02B 15/177* (2006.01)

(52) U.S. Cl.
CPC ....... *G02B 15/144507* (2019.08); *G02B 9/62* (2013.01); *G02B 13/009* (2013.01); *G02B 13/18* (2013.01); *G02B 15/1465* (2019.08); *G02B 15/177* (2013.01); *G02B 13/0045* (2013.01)

(58) Field of Classification Search
CPC ........ G02B 9/62; G02B 13/009; G02B 13/18; G02B 13/0045; G02B 15/144507; G02B 15/1465; G02B 15/177
USPC ................ 359/658, 676–706, 713, 752, 756, 359/822–826
See application file for complete search history.

*Primary Examiner* — Mahidere S Sahle
(74) *Attorney, Agent, or Firm* — W&G Law Group

(57) ABSTRACT

The present invention relates to the field of optical lenses and provides a zoom lens consisting of, from an object side to an image side in sequence, a first lens having negative refractive power, a second lens group having positive refractive power, a fifth lens having positive refractive power, and a sixth lens having negative refractive power. During zooming, a distance between adjacent lenses or between lens and adjacent lens group in a direction of an optic axis varies. The second lens group consists of a second lens having positive refractive power, a third lens having negative refractive power, and a fourth lens having negative refractive power, and following conditions are satisfied: f_Tele/f_Wide≥1.80; −1.75≤f3/f2≤−1.35; −1.75≤f4/f2≤−1.35. The present invention becomes compact when contracted, while during imaging, FNO is bright, and has good optical properties.

7 Claims, 15 Drawing Sheets

Wide

Tele

Contracted

ZOOM LENS

TECHNICAL FIELD

The present invention relates to a zoom lens having a contraction structure, and in particular relates to a zoom lens suitable for camera components for smartphones, digital cameras, etc., which adopt camera elements such as CCDs and CMOS for high pixels. The zoom lens becomes bright and has good optical properties as well as a zoom ratio above 1.80, when the F number (hereinafter referred to as FNO) at a wide-angle end is below 2.0. The zoom lens becomes compact as the TTL (total optical length of the zoom lens) in a contracted state is less than 8.00 mm. The zoom lens consists of six lenses divided into four groups.

BACKGROUND

In recent years, there has been a demand for a zoom lens in following configurations that the zoom lens has a $FNO \leq 2.0$ at a wide-angle end, a zoom ratio $\geq 1.80$, having good optical properties, and TTL would decrease when the lens barrel gets contracted into the camera during non-imaging state, and the zoom lens becomes compact when contracted.

A technical development of a zoom lens consisting of six lenses is being advanced. In a related art, as a six-piece structured zoom lens, a lens consisting of six lenses in three groups is proposed.

The camera lens disclosed in the embodiment of the related art has a zoom ratio above 4.74, but when the FNO at the wide-angle end is above 2.552, the brightness is insufficient, and the TTL during imaging is also long and the miniaturization is not sufficient.

SUMMARY

One objective of the present invention to provide such a zoom lens that the zoom lens becomes compact when contracted as $TTL \leq 8.00$ mm, and the zoom lens becomes bright when $FNO \leq 2.0$ at a wide-angle end during imaging, and the zoom lens has good optical properties and a zoom ratio $\geq 1.80$, and consists of six lenses in four groups.

In order to achieve the above objective, the inventor of the present invention carefully studied a ratio of a focal length of a third lens to a focal length of a second lens, and a ratio of a focal length of a fourth lens to the focal length of the second lens, and found that it was possible to obtain a zoom lens that could improve the subject matter of the related art, and the present invention is thus acquired.

According to one embodiment of the present invention, a zoom lens is provided. The zoom lens consists of, from an object side to an image side in sequence: a first lens having negative refractive power, a second lens group having positive refractive power, a fifth lens having positive refractive power, and a sixth lens having negative refractive power. Among the first lens, the second lens group, the fifth lens, and the sixth lens, a distance between adjacent lenses or between lens and adjacent lens group in a direction of an optic axis varies during zooming. The second lens group consists of a second lens having positive refractive power, a third lens having negative refractive power, and a fourth lens having negative refractive power. The zoom lens satisfies the following conditions: $f\_Tele/f\_Wide \geq 1.80$; $-1.75 \leq f3/f2 \leq -1.35$; and $-1.75 \leq f4/f2 \leq -1.35$; wherein, f_Wide denotes a total optical length of the zoom lens at a wide-angle (Wide) end, f_Tele denotes a total optical length of the zoom lens at a telephoto (Tele) end, f2 denotes a focal length of the second lens, f3 denotes a focal length of the third lens, and f4 denotes a focal length of the fourth lens.

As an improvement, the zoom lens further satisfies a following condition: $-1.30 \leq f1/fG2 \leq -1.00$; wherein, f1 denotes a focal length of the first lens, and fG2 denotes a combined focal length of the second lens group.

As an improvement, the zoom lens further satisfies a following condition: $0.30 \leq f5/fG2 \leq 0.40$; wherein, f5 denotes a focal length of the fifth lens, and fG2 denotes the combined focal length of the second lens group.

As an improvement, the zoom lens further satisfies a following condition: $-1.50 \leq f6/fG2 \leq -1.00$; wherein, f6 denotes a focal length of the sixth lens, and fG2 denotes the combined focal length of the second lens group.

As an improvement, the zoom lens further satisfies a following condition: $4.00 \leq LB\_Tele/LB\_Wide \leq 5.00$, wherein, LB_Wide denotes an on-axis distance from an image side surface of the sixth lens to an image surface, at the wide-angle end; and LB_Tele denotes the on-axis distance from the image side surface of the sixth lens to the image surface, at the telephoto end.

As an improvement, the zoom lens further satisfies a following condition: $76.00 \leq v1 \leq 82.00$, wherein, v1 denotes an Abbe number of the first lens.

As an improvement, the first lens is a glass lens.

Beneficial effects of the present invention are as follows.

According to the present invention, the present invention is particularly an invention relating to a zoom lens as follows. The zoom lens is suitable for camera components for smartphones, digital cameras, etc., which adopt camera elements such as CCDs and CMOS for high pixels. The zoom lens becomes compact when the TTL in a contracted state is less than 8.00 mm, while during imaging, the zoom lens becomes bright when the FNO at a wide-angle end is below 2.0. The zoom lens has good optical properties as well as a zoom ratio above 1.80, and consists of six lenses in four groups.

BRIEF DESCRIPTION OF DRAWINGS

In order to more clearly illustrate the technical solutions in the embodiments of the present disclosure, the following will briefly describe the accompanying drawings used in the description of the embodiments. Obviously, the accompanying drawings in the following description are only some embodiments of the present disclosure. For a person of ordinary skill in the art, other drawings may be obtained from these drawings without creative work.

DETAILED DESCRIPTION OF EMBODIMENTS

Figure 1:
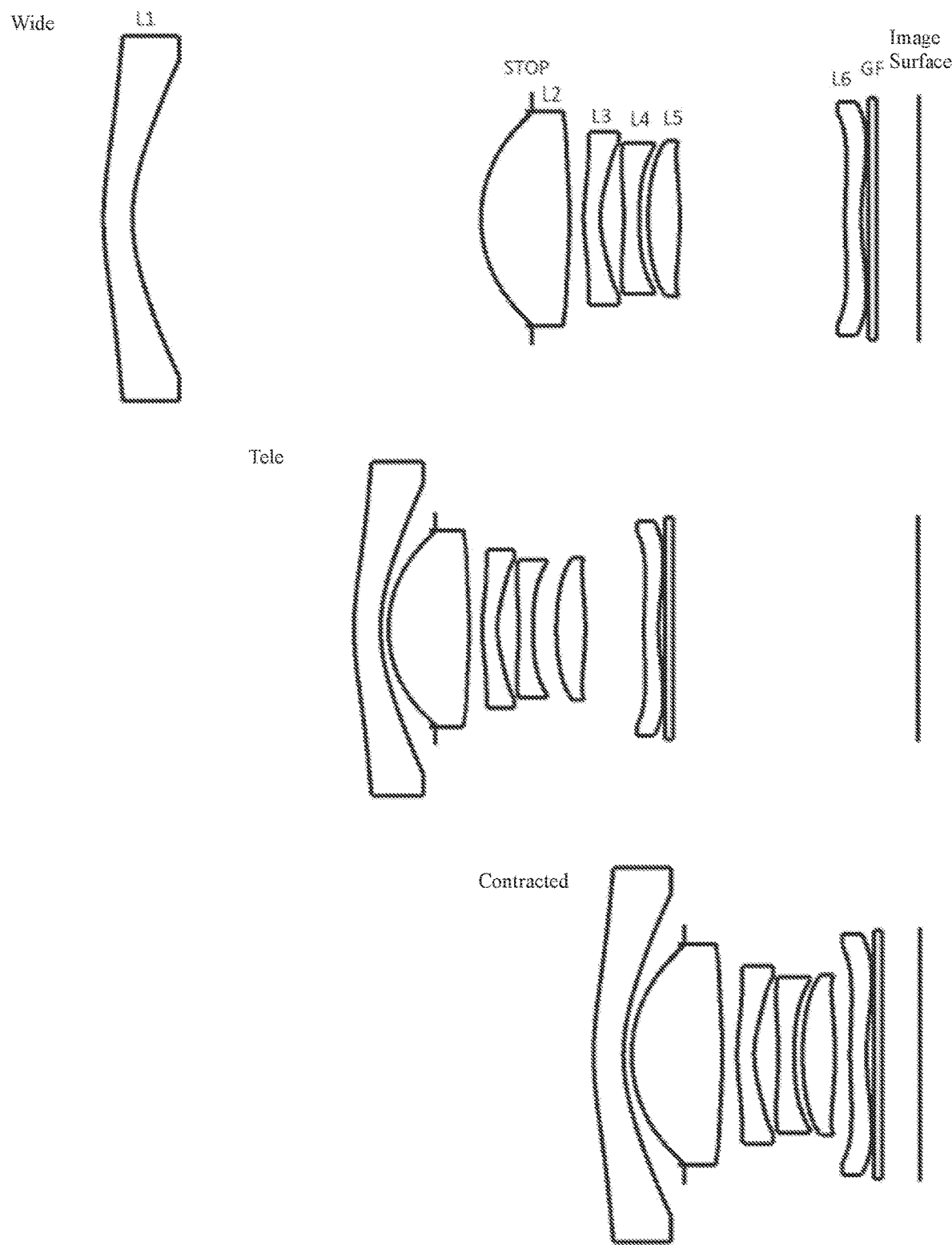
FIG. 1 is a schematic diagram of a general structure of a zoom lens LA according to Embodiment 1 of the present invention.

To make the objectives, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiments of the zoom lens in the present invention are described below. The zoom lens LA has lens system of a lens structure having six pieces in four groups. The lens structure of six pieces in four groups, comprises from an object side to an image side in sequence, a first lens L1, a second lens group G2, a fifth lens L5, and a sixth lens L6. The second lens group G2 consists of a second lens L2, a third lens L3, and a fourth lens L4. A glass plate GF is provided between the sixth lens L6 and an image surface. The glass plate GF can be a glass cover plate or any optical filter. In the present invention, the glass plate GF can be provided at different positions, or can be omitted.

The first lens L1 has negative refractive power, the second lens group G2 has positive refractive power, the fifth lens L5 has positive refractive power, and the sixth lens L6 has negative refractive power. The second lens group G2 consists of the second lens L2, the third lens L3, and the fourth lens L4, the second lens L2 has positive refractive lens, the third lens L3 has negative refractive power, and the fourth lens L4 has negative refractive power. In order to correct various aberrations, it is desirable to design all surfaces of these six lenses as aspherical surfaces.

The zoom lens LA satisfies the following condition (1):

$$f\_Tele/f\_Wide \geq 1.80 \tag{1}$$

The condition (1) specifies a zoom ratio of the zoom lens LA. When the condition (1) is satisfied, correction of each aberration is easily realized, and the zoom ratio becomes sufficient, which is an improvement.

The zoom lens LA satisfies the following condition (2):

$$-1.75 \leq f3/f2 \leq -1.35 \tag{2}$$

The condition (2) specifies a ratio of a focal length f3 of the third lens L3 to a focal length f2 of the second lens L2. If it is within the range of condition (2), miniaturization in the contracted state and correction of each aberration at the wide-angle end with FNO≤2.0 and zoom ratio ≥1.80 are easily achieved, which is an improvement.

The zoom lens LA satisfies the following condition (3):

$$-1.75 \leq f4/f2 \leq -1.35 \tag{3}$$

The condition (3) specifies a ratio of a focal length f4 of the fourth lens L4 to a focal length f2 of the second lens L2. If it is within the range of condition (3), miniaturization in the contracted state and correction of each aberration at the wide-angle end with FNO≤2.0 and zoom ratio ≥1.80 are easily achieved, which is an improvement.

The zoom lens LA satisfies the following condition (4).

$$-1.30 \leq f1/fG2 \leq -1.00 \tag{4}$$

The condition (4) specifies a ratio of a focal length f1 of the first lens L1 to a combined focal length fG2 of the second lens group G2. If it is within the range of condition (4), miniaturization in the contracted state and correction of each aberration at the wide-angle end with FNO≤2.0 and zoom ratio ≥1.80 are easily achieved, which is an improvement.

The zoom lens LA satisfies the following condition (5).

$$0.30 \leq f5/fG2 \leq 0.40 \tag{5}$$

The condition (5) specifies a ratio of a focal length f5 of the fifth lens L5 to a combined focal length fG2 of the second lens group G2. If it is within the range of condition (5), miniaturization in the contracted state and correction of each aberration at the wide-angle end with FNO≤2.0 and zoom ratio ≥1.80 are easily achieved, which is an improvement.

The zoom lens LA satisfies the following condition (6).

$$-1.50 \leq f6/fG2 \leq -1.00 \tag{6}$$

The condition (6) specifies a ratio of the focal length f6 of the sixth lens L6 to the combined focal length fG2 of the second lens group G2. If it is within the range of condition (6), miniaturization in the contracted state and correction of each aberration at the wide-angle end with FNO≤2.0 and zoom ratio ≥1.80 are easily achieved, which is an improvement.

The zoom lens LA satisfies the following condition (7).

$$4.00 \leq LB\_Tele/LB\_Wide \leq 5.00 \tag{7}$$

The condition (7) specifies a ratio of an on-axis distance LB_Tele from the image side surface S12 of the sixth lens L6 to the image surface at the telephoto end to an on-axis distance LB_Wide from the image side surface S12 of the sixth lens L6 to the image surface at the wide-angle end. If it is within the range of condition (7), miniaturization in the contracted state and correction of each aberration at the wide-angle end with FNO≤2.0 and zoom ratio ≥1.80 are easily achieved, which is an improvement.

The zoom lens LA satisfies the following condition (8).

$$76.00 \leq v1 \leq 82.00 \tag{8}$$

The condition (8) specifies an Abbe number of the first lens L1. If it is within the range of the condition (8), miniaturization in the contracted state and correction of each aberration at the wide-angle end with FNO≤2.0 and zoom ratio ≥1.80 are easily achieved, which is an improvement.

The six lenses in four groups that form the zoom lens LA satisfy the above structure as well as the conditions, respectively, so that it is possible to obtain such a zoom lens as follows: the zoom lens becomes compact as TTL≤8.00 mm in the contracted state; while during imaging, the zoom lens becomes bright as FNO≤2.0 at a wide-angle end; and the zoom lens has good optical properties as well as a zoom ratio ≥1.80, and consists of six lenses in four groups.

EMBODIMENTS

The zoom lens LA the present invention will be described with reference to the embodiments below. The reference signs described in the embodiments are listed below. In addition, the distance, radius and center thickness are all in a unit of mm.

f denotes a focal length of the zoom lens LA.

f1 denotes a focal length of the first lens L1.

fG2 denotes a combined focal length of the second lens group G2.

f2 denotes a focal length of the second lens L2.

f3 denotes a focal length of the third lens L3.

f4 denotes a focal length of the fourth lens L4.

f5 denotes a focal length of the fifth lens L5.

f6 denotes a focal length of the sixth lens L6.

FNO denotes an aperture value (a ratio of an effective focal length of the zoom lens to a diameter of a pupil of entry), or F number.

2ω denotes a full field of view.

STOP denotes an aperture.

R denotes a curvature radius of an optical surface, or a central curvature radius for a lens.

R1 denotes a curvature radius of an object side surface S1 of the first lens L1.

R2 denotes a curvature radius of an image side surface S2 of the first lens L1.

R3 denotes a curvature radius of an object side surface S3 of the second lens L2.

R4 denotes a curvature radius of an image side surface S4 of the second lens L2.

R5 denotes a curvature radius of an object side surface S5 of the third lens L3.

R6 denotes a curvature radius of an image side surface S6 of the third lens L3.

R7 denotes a curvature radius of an object side surface S7 of the fourth lens L4.

R8 denotes a curvature radius of an image side surface S8 of the fourth lens L4.

R9 denotes a curvature radius of an object side surface S9 of the fifth lens L5.

R10 denotes a curvature radius of the image side surface S10 of the fifth lens L5.

R11 denotes a curvature radius of the object side surface S11 of the sixth lens L6.

R12 denotes a curvature radius of an image side surface S12 of the sixth lens L6.

R13 denotes a curvature radius of an object side surface S13 of the glass plate GF.

R14 denotes a curvature radius of an image side surface S14 of the glass plate GF.

d denotes an on-axis thickness or an on-axis distance between lenses.

d1 denotes an on-axis thickness of the first lens L1.

D12 denotes an on-axis distance from the image side surface S2 of the first lens L1 to the object side surface S3 of the second lens L2.

d2 denotes an on-axis distance from the image side surface S2 of the first lens L1 to the aperture STOP.

d3 denotes an on-axis distance from the aperture STOP to the object side surface S3 of the second lens L2.

d4 denotes an on-axis thickness of the first lens L2.

d5 denotes an on-axis distance from the image side surface S4 of the second lens L2 to the object side surface S5 of the third lens L3.

d6 denotes an on-axis thickness of the third lens L3.

d7 denotes an on-axis distance from the image side surface S6 of the third lens L3 to the object side surface S7 of the fourth lens L4.

d8 denotes an on-axis thickness of the fourth lens L4.

d9 denotes an on-axis distance from the image side surface S8 of the fourth lens L4 to the object side surface S9 of the fifth lens L5.

d10 denotes an on-axis thickness of the fifth lens L5.

d11 denotes an on-axis distance from the image side surface S10 of the fifth lens L5 to the object side surface S11 of the sixth lens L6.

d12 denotes an on-axis thickness of the sixth lens L6.

d13 denotes an on-axis distance from the image side surface S12 of the sixth lens L6 to the object side surface S13 of the glass plate GF.

d14 denotes an on-axis thickness of the glass plate GF.

d15 denotes an on-axis distance from the image side surface S14 of the glass plate GF to an image plane.

nd denotes a refractive index of d line.

nd1 denotes a refractive index of d line of the first lens L1.

nd2 denotes a refractive index of d line of the second lens L2.

nd3 denotes a refractive index of d line of the third lens L3.

nd4 denotes a refractive index of d line of the fourth lens L4.

nd5 denotes a refractive index of d line of the fifth lens L5.

nd6 denotes a refractive index of d line of the sixth lens L6.

ndg denotes a refractive index of d line of the glass plate GF.

v denotes an abbe number.

v1 denotes an abbe number of the first lens L1.

v2 denotes an abbe number of the second lens L2.

v3 denotes an abbe number of the third lens L3.

v4 denotes an abbe number of the fourth lens L4.

v5 denotes an abbe number of the fifth lens L5.

v6 denotes an abbe number of the sixth lens L6.

vg denotes an abbe number of the glass plate GF.

TTL denotes a total optical length (on-axis distance from the object side surface S1 of the first lens L1 to the image surface) of the camera lens. and LB denotes an on-axis distance from the image side surface S12 of the sixth lens L6 to the image surface.

IH denotes an image height.

Embodiment 1

FIG. 1 is a schematic diagram of a zoom lens LA according to Embodiment 1 of the present invention. The curvature radiuses R of the image side surfaces and object side surfaces of the first lens L1 to the sixth lens L6 of the camera lens LA according to the Embodiment 1, the on-axis thicknesses of the lenses, or on-axis distances d between the lenses, refractive indexes nd, abbe numbers vd are shown in Table 1. Values of A-D during imaging and in the contracted state are shown in Table 2; conic coefficients k and aspheric coefficients are shown in Table 3; and FNO, 2ω, f, TTL, LB, f1, fG2, f2, f3, f4,

TABLE 1

|  |  | R |  | d |  | nd |  | vd | Effective radius (mm) |
|---|---|---|---|---|---|---|---|---|---|
| S1 | R1 | 7.67105 | d1 | 0.719 | nd1 | 1.5264 | v1 | 76.860 | 4.535 |
| S2 | R2 | 4.27375 | D12 d2 | A |  |  |  |  | 3.923 |
| Stop |  | ∞ | d3 | −1.261 |  |  |  |  | 2.667 |
| S3 | R3 | 3.31060 | d4 | 2.201 | nd2 | 1.5438 | v2 | 56.029 | 2.670 |
| S4 | R4 | −10.44730 | d5 | 0.353 |  |  |  |  | 2.504 |
| S5 | R5 | 4.55214 | d6 | 0.411 | nd3 | 1.6153 | v3 | 25.936 | 2.154 |
| S6 | R6 | 2.35630 | d7 | 0.583 |  |  |  |  | 1.890 |
| S7 | R7 | −8.09266 | d8 | 0.386 | nd4 | 1.6700 | v4 | 19.392 | 1.878 |
| S8 | R8 | 11.80297 | d9 | B |  |  |  |  | 1.845 |
| S9 | R9 | 7.55688 | d10 | 0.783 | nd5 | 1.6153 | v5 | 25.936 | 1.935 |
| S10 | R10 | −7.66352 | d11 | C |  |  |  |  | 1.906 |
| S11 | R11 | 10.46885 | d12 | 0.400 | nd6 | 1.5346 | v6 | 55.695 | 2.633 |
| S12 | R12 | 5.67503 | d13 | 0.173 |  |  |  |  | 2.909 |
| S13 | R13 | ∞ | d14 | 0.210 | ndg | 1.5168 | vg | 64.167 | 2.974 |
| S14 | R14 | ∞ | d15 | D |  |  |  |  | 3.010 |

Reference wavelength = 587.6 nm

TABLE 2

|  | Imaging | | Contracted |
|---|---|---|---|
|  | Wide | Tele |  |
| A | 9.953 | 1.478 | 1.461 |
| B | 0.225 | 0.633 | 0.200 |
| C | 4.122 | 1.591 | 0.360 |
| D | 1.040 | 6.661 | 0.890 |

TABLE 3

| | Cone coefficient | Aspheric surface coefficient | | | |
|---|---|---|---|---|---|
| | k | A4 | A6 | A8 | A10 |
| S1 | 0.0000E+00 | −5.7385E−03 | 3.6299E−04 | −2.0970E−05 | 1.3349E−06 |
| S2 | 0.0000E+00 | −8.2258E−03 | 6.3034E−04 | −9.4459E−05 | 1.2558E−05 |
| S3 | −3.0952E−01 | 7.4776E−04 | 5.9198E−04 | −4.1787E−04 | 1.7321E−04 |
| S4 | 0.0000E+00 | 1.2256E−02 | −2.4500E−03 | 5.9863E−04 | −1.3437E−04 |
| S5 | 0.0000E+00 | −3.8659E−02 | 3.8995E−03 | 1.7269E−03 | −9.8686E−04 |
| S6 | −7.6118E+00 | −3.3312E−03 | −1.7005E−02 | 1.4689E−02 | −6.6600E−03 |
| S7 | −5.0000E+01 | 7.0086E−03 | 3.1047E−03 | −2.8514E−03 | 1.8458E−03 |
| S8 | 0.0000E+00 | 3.9299E−02 | −1.6687E−02 | 9.4272E−03 | −3.0949E−03 |
| S9 | 0.0000E+00 | 2.8733E−02 | −2.7964E−02 | 1.9781E−02 | −8.2089E−03 |
| S10 | 0.0000E+00 | 2.9511E−02 | −3.5157E−02 | 3.2777E−02 | −1.7888E−02 |
| S11 | −1.0888E+01 | −1.7153E−02 | 2.6433E−03 | −3.2400E−04 | 4.3365E−05 |
| S12 | −3.0710E+01 | −5.1779E−03 | −1.6955E−03 | 7.6430E−04 | −1.4174E−04 |

| | Cone coefficient | Aspheric surface coefficient | | |
|---|---|---|---|---|
| | k | A12 | A14 | A16 |
| S1 | 0.0000E+00 | −8.1503E−08 | 3.1114E−09 | −4.9180E−11 |
| S2 | 0.0000E+00 | −1.1269E−06 | 5.4030E−08 | −1.0782E−09 |
| S3 | −3.0952E−01 | −3.7552E−05 | 4.1525E−06 | −1.9096E−07 |
| S4 | 0.0000E+00 | 1.6965E−05 | −1.2495E−06 | 4.1593E−08 |
| S5 | 0.0000E+00 | 2.3274E−04 | −2.6947E−05 | 1.3007E−06 |
| S6 | −7.6118E+00 | 2.0674E−03 | −3.7602E−04 | 3.0038E−05 |

TABLE 3-continued

| | | | |
|---|---|---|---|
| S7 | −5.0000E+01 | −5.7675E−04 | 8.1320E−05 | −4.3265E−06 |
| S8 | 0.0000E+00 | 5.0214E−04 | −3.6684E−05 | 6.1773E−07 |
| S9 | 0.0000E+00 | 2.0668E−03 | −2.9319E−04 | 1.9034E−05 |
| S10 | 0.0000E+00 | 5.7863E−03 | −1.0236E−03 | 7.7626E−05 |
| S11 | −1.0888E+01 | −1.2835E−05 | 1.8482E−06 | −9.0136E−08 |
| S12 | −3.0710E+01 | 9.1737E−06 | 1.6138E−07 | −2.8105E−08 |

Herein, K is a conic coefficient, A4, A6, A8, A10, A12, A14, and A16 are aspheric surface coefficients.

$$y=(x^2/R)/[1+\{1-(k+1)(x^2/R^2)\}^{1/2}]+A4x^4+A6x^6+A8x^8+A10x^{10}+A12x^{12}\pm A14x^{14}+A16x^{16} \quad (9)$$

Herein, x is a vertical distance between a point on an aspherical curve and the optic axis, and y is an aspherical depth (a vertical distance between a point on an aspherical surface, having a distance of x from the optic axis, and a surface tangent to a vertex of the aspherical surface on the optic axis).

For convenience, an aspheric surface of each lens surface adopts the aspheric surfaces shown in the condition (9). However, the present invention is not limited to the aspherical polynomials form shown in the condition (8).

TABLE 4

| | Wide | Tele |
|---|---|---|
| Fno | 1.96 | 2.84 |
| 2ω (°) | 46.29 | 24.00 |
| f (mm) | 7.110 | 14.536 |

| | Wide | Tele | Contracted |
|---|---|---|---|
| TTL (mm) | 20.298 | 15.323 | 7.870 |
| LB (mm) | 1.423 | 7.044 | 1.273 |
| f1 (mm) | | | −19.776 |
| f2 (mm) | | | 15.970 |
| f2 (mm) | | | 4.899 |
| f3 (mm) | | | −8.549 |
| f4 (mm) | | | −7.110 |
| f5 (mm) | | | 6.308 |
| f6 (mm) | | | −23.877 |
| IH (mm) | | | 3.074 |
| Zoom ratio | | | 2.044 |

The following Table 21 shows corresponding values of the parameters defined in the conditions (1) to (8) of Embodiments 1-5.

As shown in the Table 21, the embodiment 1 satisfies the conditions (1) to (8).

Figure 2:
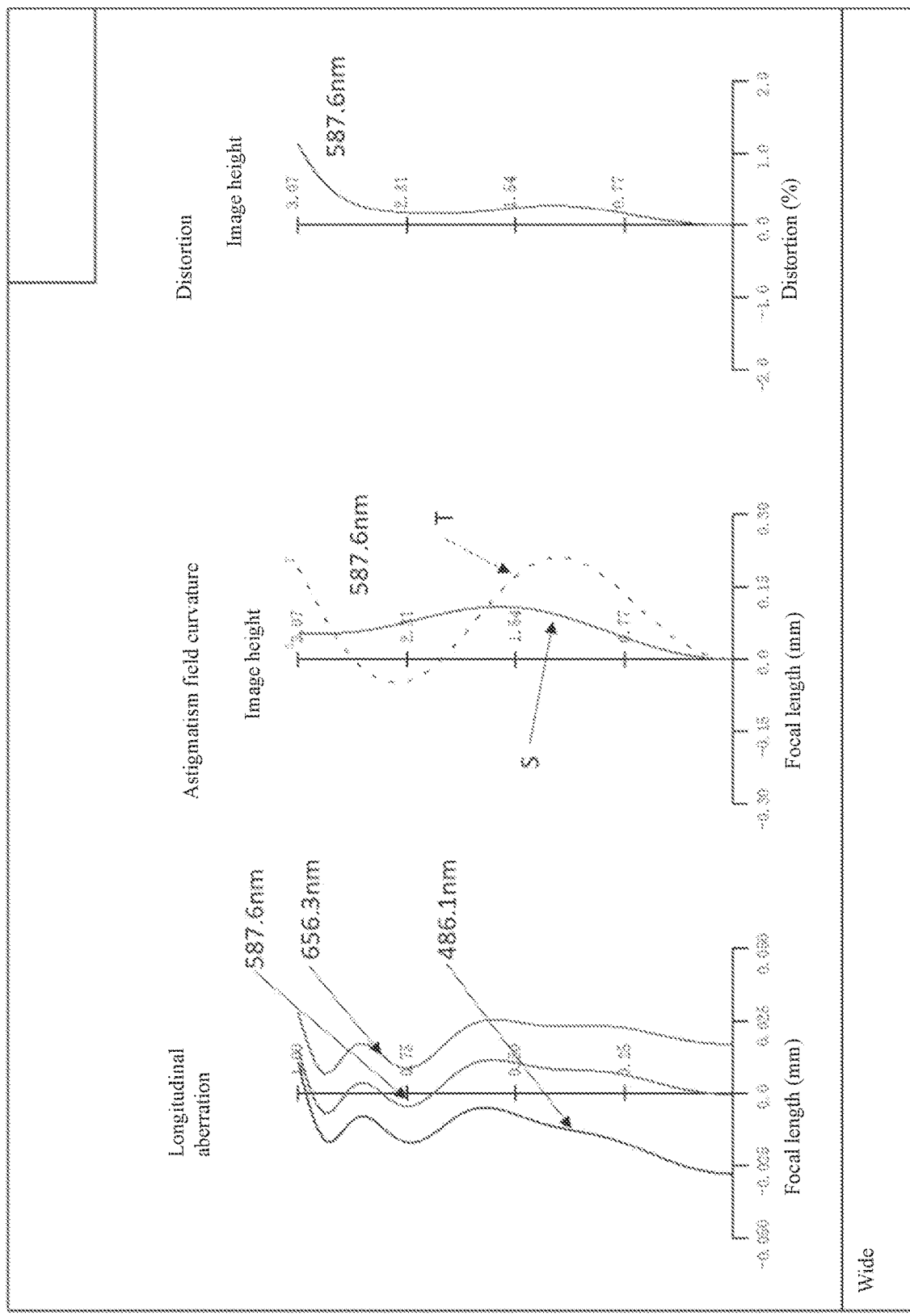
FIG. 2 is a schematic diagram of a longitudinal aberration, an astigmatism field curvature and a distortion of the zoom lens LA at a wide-angle end according to Embodiment 1 of the present invention.
Figure 3:
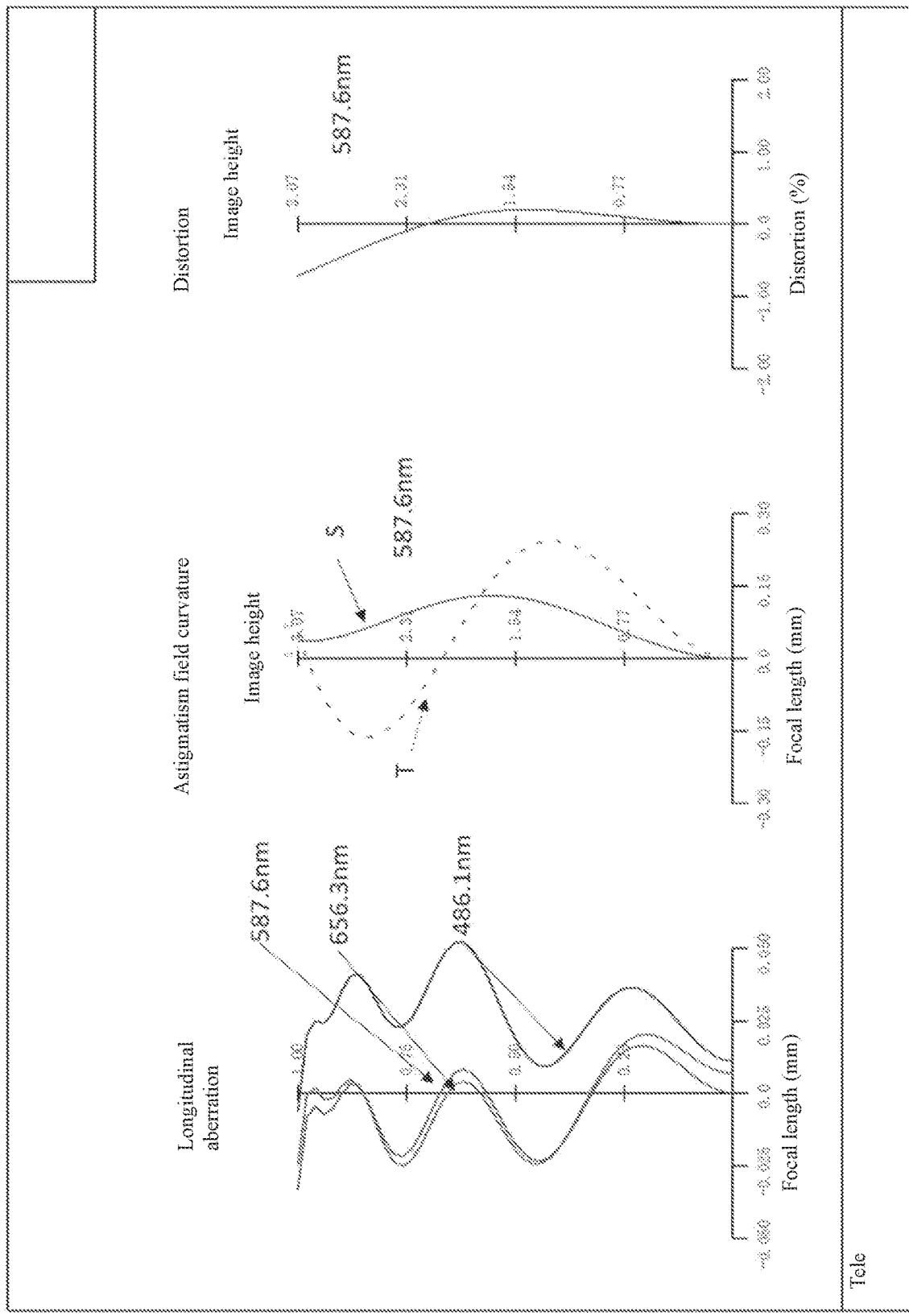
FIG. 3 is a schematic diagram of a longitudinal aberration, an astigmatism field curvature and a distortion of the zoom lens LA at a telephoto end according to Embodiment 1 of the present invention.

FIG. 2 illustrates an axial spherical aberration, an astigmatism field curvature, and a distortion of the zoom lens LA according to Embodiment 1 at the wide-angle end. FIG. 3 illustrates an axial spherical aberration, an astigmatism field curvature, and a distortion of the zoom lens LA according to Embodiment 1 at the telephoto end. It should be noted that, curvature S in the figures is a field curvature for a sagittal image plane, and T is a field curvature for a meridional image plane, which are the same for Embodiments 2-5. It can be known that the zoom lens LA of the embodiment 1 becomes compact as TTL=7.870 when contracted, while the zoom lens becomes bright when FNO=1.96 at the wide-angle end, and the zoom ratio=2.044 and the zoom lens has good optical properties, as shown in FIG. 2 and FIG. 3.

Embodiment 2

Figure 4:
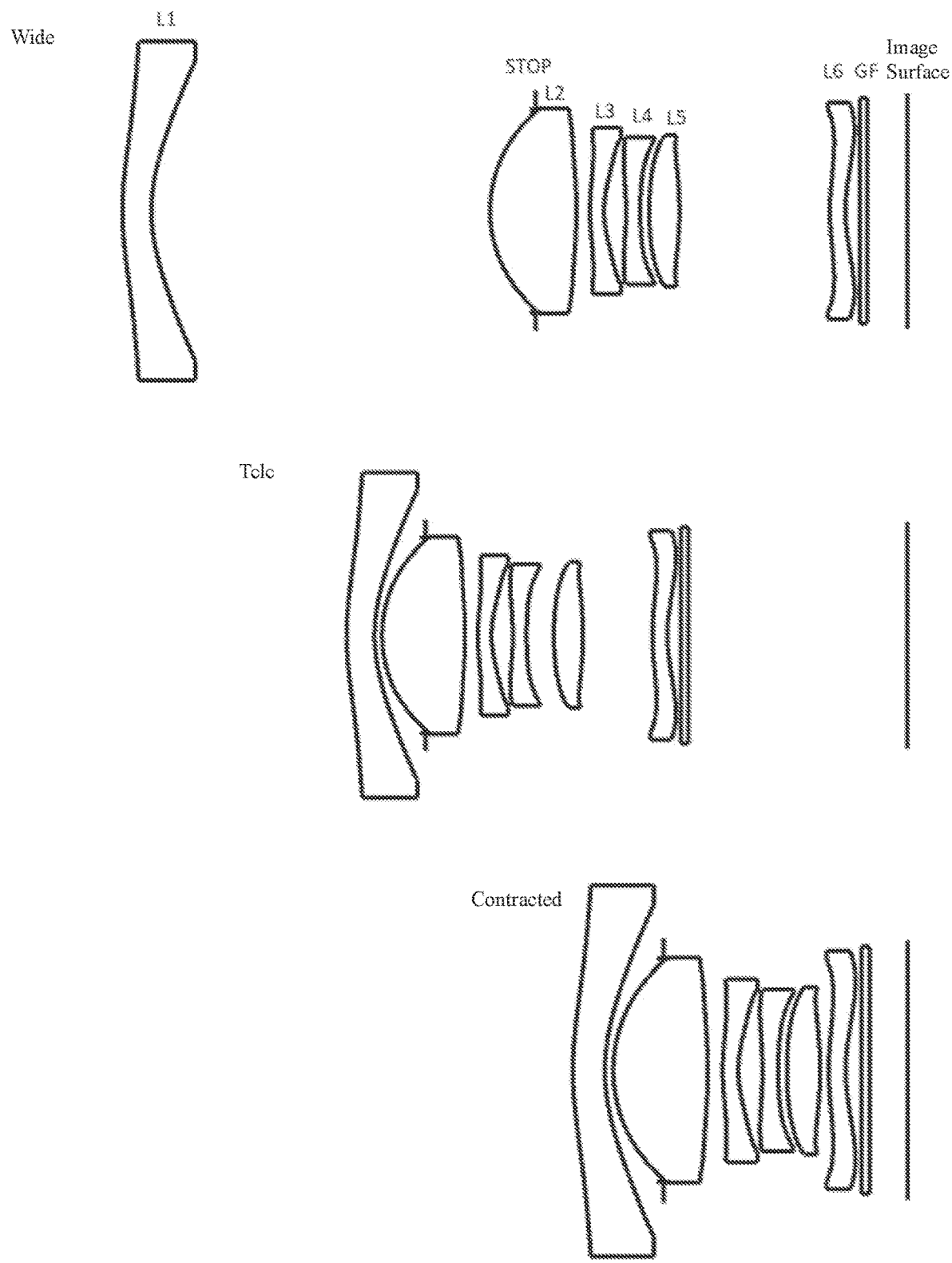
FIG. 4 is a schematic diagram of a general structure of a zoom lens LA according to Embodiment 2 of the present invention.

FIG. 4 is a schematic diagram of a zoom lens LA according to Embodiment 2 of the present invention. The curvature radiuses R of the image side surfaces and object side surfaces of the first lens L1 to the sixth lens L6 of the camera lens LA according to the Embodiment 2, the on-axis thicknesses of the lenses or on-axis distances d between the lenses, refractive indexes nd, abbe numbers vd are shown in Table 5. Values of A-D during imaging and in the contracted state are shown in Table 6; conic coefficients k and aspheric coefficients are shown in Table 7; and FNO, 2ω, f, TTL, LB, f1, fG2, f2, f3, f4, f5, f6, IH and zoom ratios are shown in Table 8.

TABLE 5

| | | R | | d | | nd | vd | Effective radius (mm) |
|---|---|---|---|---|---|---|---|---|
| S1 | R1 | 7.85611 | d1 | 0.755 | nd1 | 1.4959 | v1 81.655 | 4.400 |
| S2 | R2 | 4.27586 | D12 d2 | A | | | | 3.928 |
| Stop | | ∞ | d3 | −1.181 | | | | 2.653 |
| S3 | R3 | 3.34061 | d4 | 2.249 | nd2 | 1.5438 | v2 56.029 | 2.665 |
| S4 | R4 | −9.29516 | d5 | 0.348 | | | | 2.505 |
| S5 | R5 | 5.01403 | d6 | 0.369 | nd3 | 1.6153 | v3 25.936 | 2.167 |
| S6 | R6 | 2.47207 | d7 | 0.575 | | | | 1.920 |
| S7 | R7 | −7.39526 | d8 | 0.372 | nd4 | 1.6700 | v4 19.392 | 1.916 |
| S8 | R8 | 13.50619 | d9 | B | | | | 1.883 |
| S9 | R9 | 7.95199 | d10 | 0.790 | nd5 | 1.6153 | v5 25.936 | 1.976 |
| S10 | R10 | −7.40039 | d11 | C | | | | 1.957 |
| S11 | R11 | 6.04949 | d12 | 0.400 | nd6 | 1.5346 | v6 55.695 | 2.633 |
| S12 | R12 | 3.88313 | d13 | 0.367 | | | | 2.825 |
| S13 | R13 | ∞ | d14 | 0.210 | ndg | 1.5168 | vg 64.167 | 2.891 |
| S14 | R14 | ∞ | d15 | D | | | | 2.933 |

Reference wavelength = 587.6 nm

TABLE 6

| | Imaging | | |
|---|---|---|---|
| | Wide | Tele | Contracted |
| A | 10.027 | 1.382 | 1.381 |
| B | 0.228 | 0.737 | 0.200 |
| C | 3.932 | 1.873 | 0.200 |
| D | 1.040 | 5.909 | 0.890 |

TABLE 7

| | Cone coefficient | Aspheric surface coefficient | | | |
|---|---|---|---|---|---|
| | k | A4 | A6 | A8 | A10 |
| S1 | 0.0000E+00 | −5.7385E−03 | 3.6299E−04 | −2.0970E−05 | 1.3349E−06 |
| S2 | 0.0000E+00 | −8.2258E−03 | 6.3034E−04 | −9.4459E−05 | 1.2558E−05 |
| S3 | −3.4604E−01 | 7.4776E−04 | 5.9198E−04 | −4.1787E−04 | 1.7321E−04 |
| S4 | 0.0000E+00 | 1.2256E−02 | −2.4500E−03 | 5.9863E−04 | −1.3437E−04 |
| S5 | 0.0000E+00 | −3.8659E−02 | 3.8995E−03 | 1.7269E−03 | −9.8686E−04 |
| S6 | −7.3622E+00 | −4.0242E−03 | −1.6553E−02 | 1.4133E−02 | −6.3262E−03 |
| S7 | −4.9931E+01 | 7.0086E−03 | 3.1047E−03 | −2.8514E−03 | 1.8458E−03 |
| S8 | 0.0000E+00 | 2.2997E−02 | 5.1423E−03 | −8.1196E−03 | 5.3772E−03 |
| S9 | 0.0000E+00 | 5.6199E−03 | 6.3134E−03 | −7.5190E−03 | 4.4893E−03 |
| S10 | 0.0000E+00 | 1.5263E−02 | −1.0533E−02 | 9.9879E−03 | −5.5760E−03 |
| S11 | −1.0309E+01 | −1.7153E−02 | 2.6433E−03 | −3.2400E−04 | 4.3365E−05 |
| S12 | −1.3533E+01 | −5.1779E−03 | −1.6955E−03 | 7.6430E−04 | −1.4174E−04 |

| | Cone coefficient | Aspheric surface coefficient | | |
|---|---|---|---|---|
| | k | A12 | A14 | A16 |
| S1 | 0.0000E+00 | −8.1503E−08 | 3.1114E−09 | −4.9180E−11 |
| S2 | 0.0000E+00 | −1.1269E−06 | 5.4030E−08 | −1.0782E−09 |
| S3 | −3.4604E−01 | −3.7552E−05 | 4.1525E−06 | −1.9096E−07 |
| S4 | 0.0000E+00 | 1.6965E−05 | −1.2495E−06 | 4.1593E−08 |
| S5 | 0.0000E+00 | 2.3274E−04 | −2.6947E−05 | 1.3007E−06 |
| S6 | −7.3622E+00 | 1.9197E−03 | −3.4188E−04 | 2.6649E−05 |
| S7 | −4.9931E+01 | −5.7675E−04 | 8.1320E−05 | −4.3265E−06 |
| S8 | 0.0000E+00 | −1.9020E−03 | 3.3746E−04 | −2.4089E−05 |
| S9 | 0.0000E+00 | −1.3925E−03 | 2.1756E−04 | −1.2913E−05 |
| S10 | 0.0000E+00 | 1.8776E−03 | −3.4725E−04 | 2.7684E−05 |
| S11 | −1.0309E+01 | −1.2835E−05 | 1.8482E−06 | −9.0136E−08 |
| S12 | −1.3533E+01 | 9.1737E−06 | 1.6138E−07 | −2.8105E−08 |

TABLE 8

| | Wide | Tele |
|---|---|---|
| Fno | 1.96 | 2.78 |
| 2ω (°) | 46.91 | 24.64 |
| f (mm) | 7.110 | 14.220 |

| | Wide | Tele | Contracted |
|---|---|---|---|
| TTL (mm) | 20.481 | 15.154 | 7.925 |
| LB (mm) | 1.617 | 6.486 | 1.467 |
| f1 (mm) | | | −20.341 |
| fG2 (mm) | | | 16.293 |
| f2 (mm) | | | 4.821 |
| f3 (mm) | | | −8.389 |
| f4 (mm) | | | −7.081 |
| f5 (mm) | | | 6.354 |
| f6 (mm) | | | −21.678 |
| IH (mm) | | | 3.074 |
| Zoom ratio | | | 2.000 |

As shown in the table 21, the embodiment 2 satisfies the conditions (1)~(8).

Figure 5:
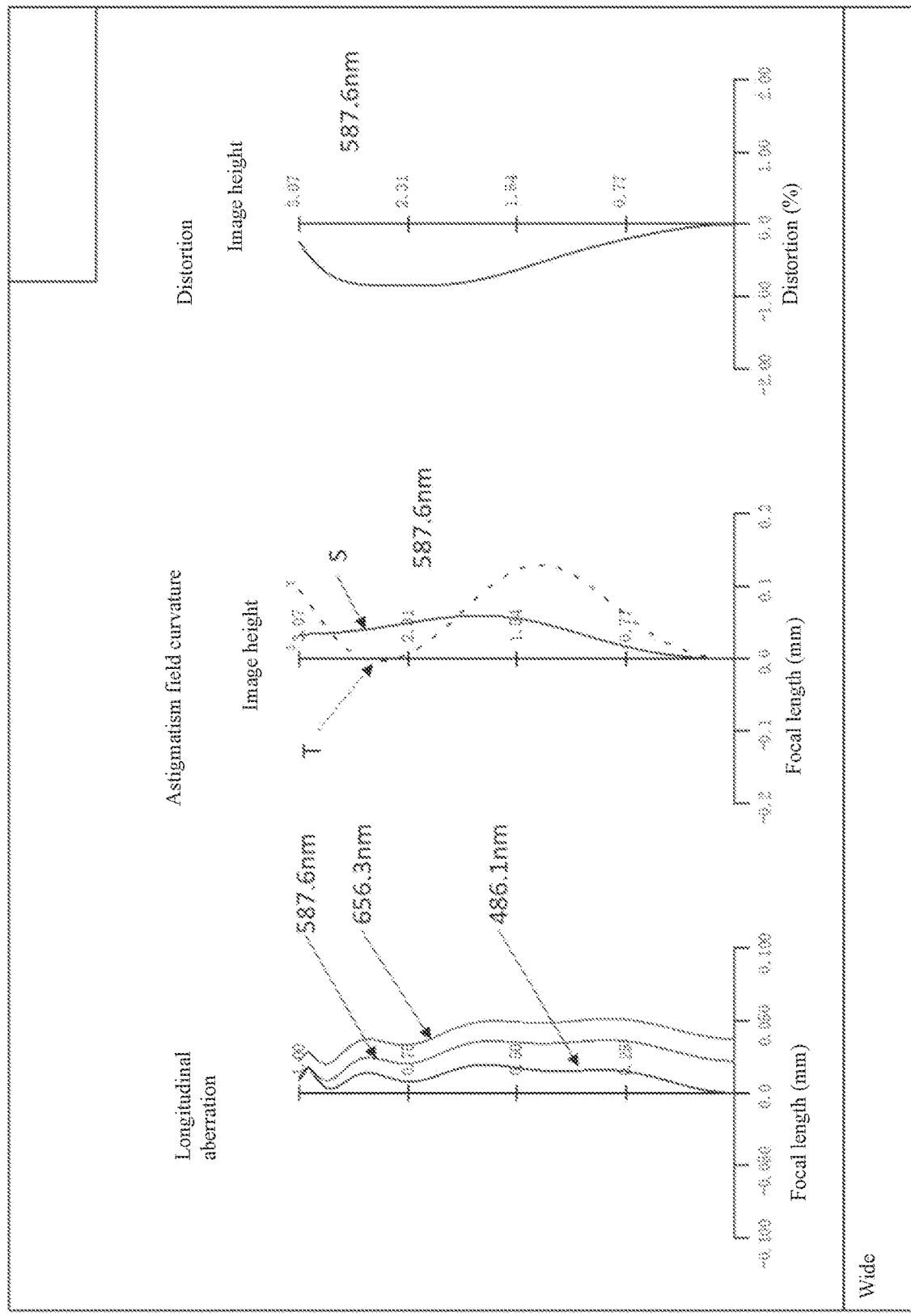
FIG. 5 is a schematic diagram of a longitudinal aberration, an astigmatism field curvature and a distortion of the zoom lens LA at a wide-angle end according to Embodiment 2 of the present invention.
Figure 6:
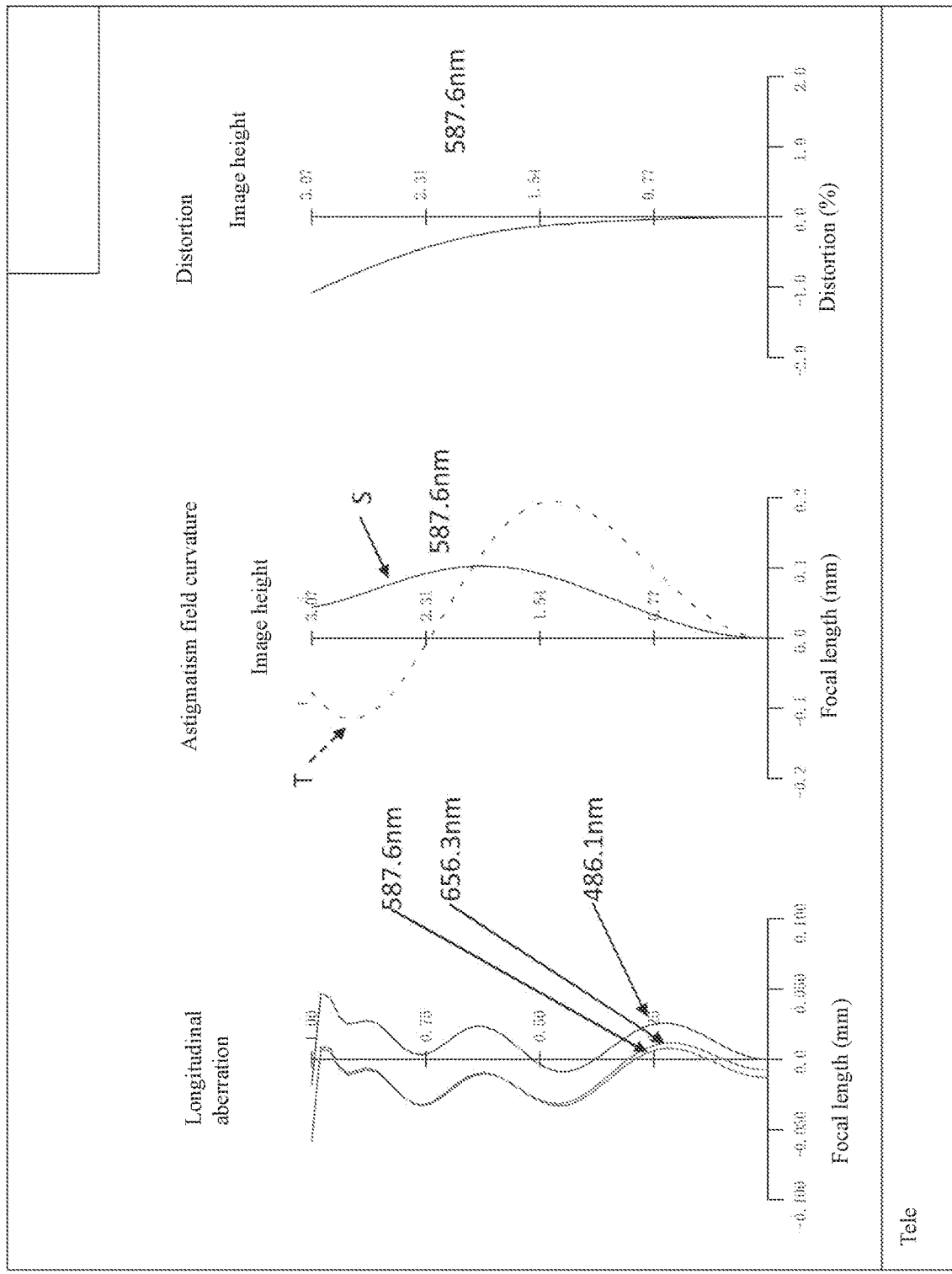
FIG. 6 is a schematic diagram of a longitudinal aberration, an astigmatism field curvature and a distortion of the zoom lens LA at a telephoto end according to Embodiment 2 of the present invention.

FIG. 5 illustrates an axial spherical aberration, an astigmatism field curvature, and a distortion of the zoom lens LA according to Embodiment 2 at the wide-angle end. FIG. 6 illustrates an axial spherical aberration, an astigmatism field curvature, and a distortion of the zoom lens LA according to Embodiment 2 at the telephoto end. It can be known that the zoom lens LA of the embodiment 2 becomes compact when TTL=7.925 in the contracted state, while the zoom lens becomes bright when FNO=1.96 at the wide-angle end, and the zoom ratio=2.000 and the zoom lens has good optical properties, as shown in FIG. 5 and FIG. 6.

Embodiment 3

Figure 7:
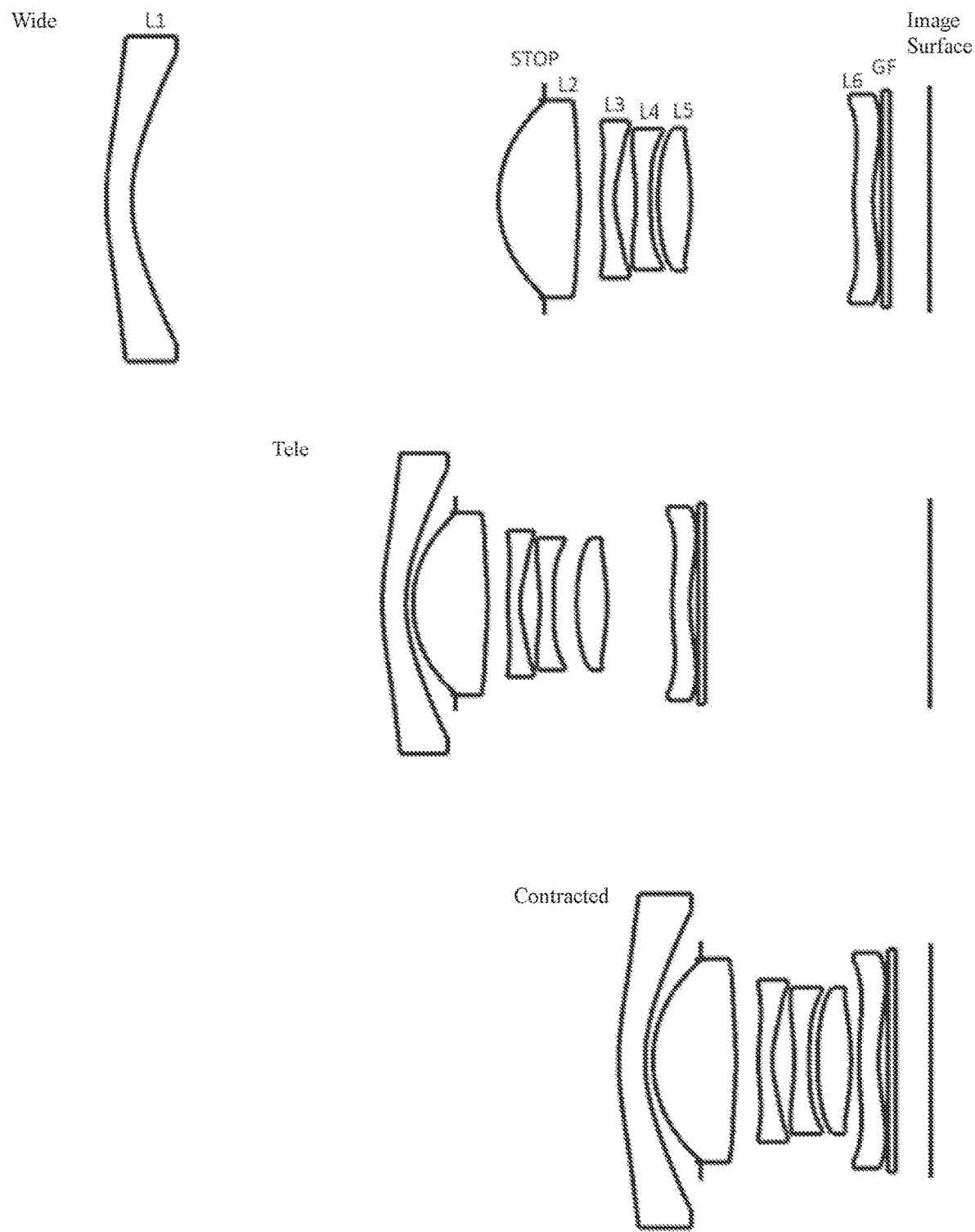
FIG. 7 is a schematic diagram of a general structure of a zoom lens LA according to Embodiment 3 of the present invention.

FIG. 7 is a schematic diagram of a zoom lens LA according to Embodiment 3 of the present invention. The curvature radiuses R of the image side surfaces and object side surfaces of the first lens L1 to the sixth lens L6 of the camera lens LA according to the Embodiment 3, the on-axis thicknesses of the lenses or on-axis distances d between the lenses, refractive indexes nd, abbe numbers vd are shown in Table 9. Values of A-D during imaging and in the contracted state are shown in Table 10; conic coefficients k and aspheric coefficients are shown in Table 11; and FNO, 2ω, f, TTL, LB, f1, fG2, f2, f3, f4, f5, f6, IH and zoom ratios are shown in Table 12.

TABLE 9

|  |  | R | d |  | nd |  | vd | Effective radius (mm) |
|---|---|---|---|---|---|---|---|---|
| S1 | R1 | 7.46267 | d1 | 0.664 | nd1 | 1.4959 | v1 81.655 | 4.380 |
| S2 | R2 | 4.26720 | d2 | A |  |  |  | 3.945 |
| Stop |  | ∞ | D12 d3 | −1.198 |  |  |  | 2.656 |
| S3 | R3 | 3.42597 | d4 | 2.105 | nd2 | 1.5438 | v2 56.029 | 2.659 |
| S4 | R4 | −10.42114 | d5 | 0.575 |  |  |  | 2.505 |
| S5 | R5 | 6.09062 | d6 | 0.350 | nd3 | 1.6153 | v3 25.936 | 2.123 |
| S6 | R6 | 2.43733 | d7 | 0.554 |  |  |  | 1.927 |
| S7 | R7 | −5.83850 | d8 | 0.383 |  |  |  | 1.917 |
| S8 | R8 | −1.8486E+04 | d9 | B | nd4 | 1.6700 | v4 19.392 | 1.862 |
| S9 | R9 | 10.01671 | d10 | 0.848 | nd5 | 1.6153 | v5 25.936 | 1.920 |
| S10 | R10 | −5.79361 | d11 | C |  |  |  | 1.907 |
| S11 | R11 | 7.72372 | d12 | 0.495 | nd6 | 1.5346 | v6 55.695 | 2.593 |
| S12 | R12 | 4.55751 | d13 | 0.228 |  |  |  | 2.825 |
| S13 | R13 | ∞ | d14 | 0.210 | ndg | 1.5168 | vg 64.167 | 2.877 |
| S14 | R14 | ∞ | d15 | D |  |  |  | 2.924 |

Reference wavelength = 587.6 nm

TABLE 10

|  | Imaging | | |
|---|---|---|---|
|  | Wide | Tele | Contracted |
| A | 10.778 | 1.398 | 1.398 |
| B | 0.200 | 0.655 | 0.200 |
| C | 4.269 | 1.836 | 0.200 |
| D | 1.040 | 6.323 | 0.890 |

TABLE 11

|  | Cone coefficient | Aspheric surface coefficient | | | |
|---|---|---|---|---|---|
|  | k | A4 | A6 | A8 | A10 |
| S1 | 0.0000E+00 | −5.7385E−03 | 3.6299E−04 | −2.0970E−05 | 1.3349E−06 |
| S2 | 0.0000E+00 | −8.2258E−03 | 6.3034E−04 | −9.4459E−05 | 1.2558E−05 |
| S3 | −2.9795E−01 | 7.4776E−04 | 5.9198E−04 | −4.1787E−04 | 1.7321E−04 |
| S4 | 0.0000E+00 | 1.2256E−02 | −2.4500E−03 | 5.9863E−04 | −1.3437E−04 |
| S5 | 0.0000E+00 | −3.8659E−02 | 3.8995E−03 | 1.7269E−03 | −9.8686E−04 |
| S6 | −1.6152E+01 | 3.3119E−02 | −5.2214E−02 | 3.1740E−02 | −1.1387E−02 |
| S7 | −2.8609E+01 | 7.0086E−03 | 3.1047E−03 | −2.8514E−03 | 1.8458E−03 |
| S8 | 0.0000E+00 | 7.5818E−02 | −6.9821E−02 | 5.9611E−02 | −3.0265E−02 |
| S9 | 0.0000E+00 | 5.3072E−02 | −6.7867E−02 | 5.2936E−02 | −2.3826E−02 |
| S10 | 0.0000E+00 | 4.7580E−02 | −7.0519E−02 | 6.4055E−02 | −3.3541E−02 |
| S11 | −1.6562E+01 | −1.7153E−02 | 2.6433E−03 | −3.2400E−04 | 4.3365E−05 |
| S12 | −1.9405E+01 | −5.1779E−03 | −1.6955E−03 | 7.6430E−04 | −1.4174E−04 |

|  | Cone coefficient | Aspheric surface coefficient | | |
|---|---|---|---|---|
|  | k | A12 | A14 | A16 |
| S1 | 0.0000E+00 | −8.1503E−08 | 3.1114E−09 | −4.9180E−11 |
| S2 | 0.0000E+00 | −1.1269E−06 | 5.4030E−08 | −1.0782E−09 |
| S3 | −2.9795E−01 | −3.7552E−05 | 4.1525E−06 | −1.9096E−07 |
| S4 | 0.0000E+00 | 1.6965E−05 | −1.2495E−06 | 4.1593E−08 |
| S5 | 0.0000E+00 | 2.3274E−04 | −2.6947E−05 | 1.3007E−06 |
| S6 | −1.6152E+01 | 2.7453E−03 | −4.0346E−04 | 2.6885E−05 |
| S7 | −2.8609E+01 | −5.7675E−04 | 8.1320E−05 | −4.3265E−06 |
| S8 | 0.0000E+00 | 8.8179E−03 | −1.3829E−03 | 9.0597E−05 |
| S9 | 0.0000E+00 | 6.2820E−03 | −8.9843E−04 | 5.4650E−05 |
| S10 | 0.0000E+00 | 1.0269E−02 | −1.7013E−03 | 1.1907E−04 |
| S11 | −1.6562E+01 | −1.2835E−05 | 1.8482E−06 | −9.0136E−08 |
| S12 | −1.9405E+01 | 9.1737E−06 | 1.6138E−07 | −2.8105E−08 |

TABLE 12

|  | Wide | Tele |
|---|---|---|
| Fno | 1.97 | 2.77 |
| 2ω (°) | 45.18 | 24.53 |
| f (mm) | 7.110 | 14.220 |

|  | Wide | Tele | Contracted |
|---|---|---|---|
| TTL (mm) | 21.500 | 15.425 | 7.902 |
| LB (mm) | 1.478 | 6.761 | 1.328 |
| f1 (mm) |  |  | −21.582 |
| fG2 (mm) |  |  | 19.983 |
| f2 (mm) |  |  | 5.009 |
| f3 (mm) |  |  | −6.854 |
| f4 (mm) |  |  | −8.716 |
| f5 (mm) |  |  | 6.090 |
| f6 (mm) |  |  | −21.995 |
| IH (mm) |  |  | 3.074 |
| Zoom ratio |  |  | 2.000 |

As shown in the table 21, the embodiment 3 satisfies the conditions (1)~(8).

Figure 8:
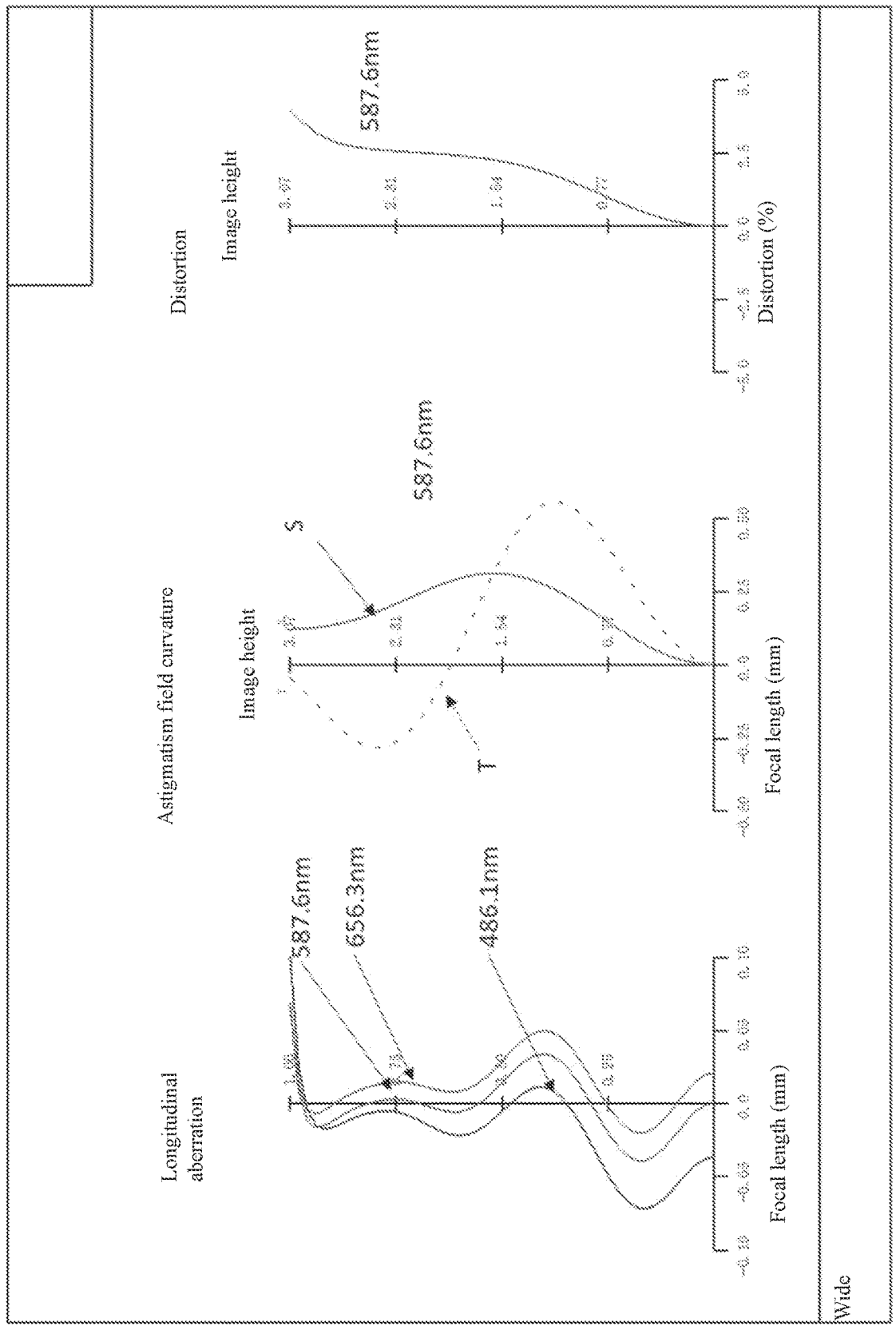
FIG. 8 is a schematic diagram of a longitudinal aberration, an astigmatism field curvature and a distortion of the zoom lens LA at a wide-angle end according to Embodiment 3 of the present invention.
Figure 9:
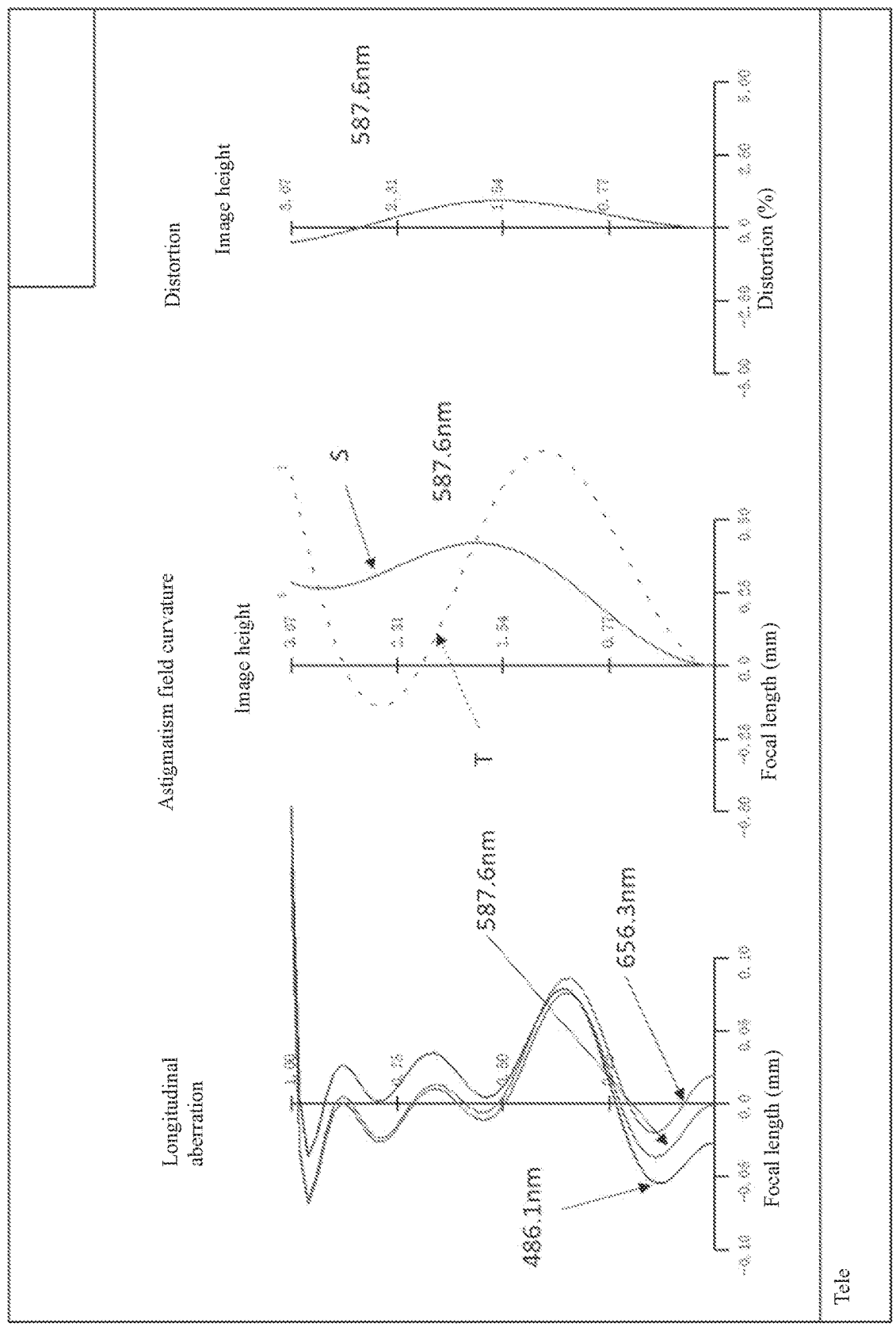
FIG. 9 is a schematic diagram of a longitudinal aberration, an astigmatism field curvature and a distortion of the zoom lens LA at a telephoto end according to Embodiment 3 of the present invention.

FIG. 8 illustrates an axial spherical aberration, an astigmatism field curvature, and a distortion of the zoom lens LA according to Embodiment 3 at the wide-angle end. FIG. 9 illustrates an axial spherical aberration, an astigmatism field curvature, and a distortion of the zoom lens LA according to Embodiment 3 at the telephoto end. It can be known that the zoom lens LA of the embodiment 3 becomes compact when TTL=7.902 in the contracted state, while the zoom lens becomes bright when FNO=1.97 at the wide-angle end, and the zoom ratio=2.000 and the zoom lens has good optical properties, as shown in FIG. 8 and FIG. 9.

Embodiment 4

Figure 10:
FIG. 10 is a schematic diagram of a general structure of a zoom lens LA according to Embodiment 4 of the present invention.
Figure 10:
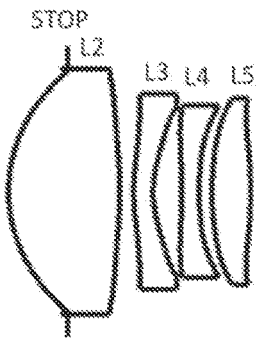
Figure 10:
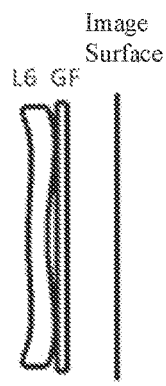
Figure 10:
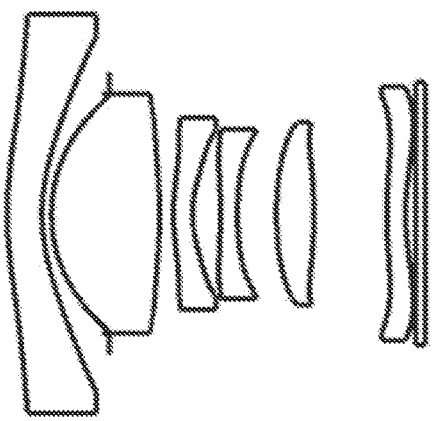
Figure 10:
Figure 10:
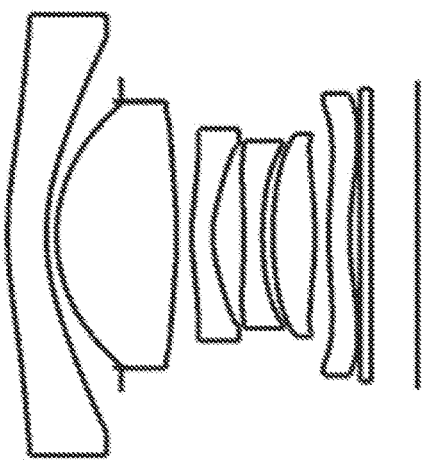

FIG. 10 is a schematic diagram of a zoom lens LA according to Embodiment 4 of the present invention. The curvature radiuses R of the image side surfaces and object side surfaces of the first lens L1 to the sixth lens L6 of the camera lens LA according to the Embodiment 4, the on-axis thicknesses of the lenses or on-axis distances d between the lenses, refractive indexes nd, abbe numbers vd are shown in Table 13. Values of A-D during imaging and in the contracted state are shown in Table 14; conic coefficients k and aspheric coefficients are shown in Table 15; and FNO, 2ω, f, TTL, LB, f1, fG2, f2, f3, f4, f5, f6, IH and zoom ratios are shown in Table 16.

TABLE 13

|  |  | R |  | d |  | nd |  | vd | Effective radius (mm) |
|---|---|---|---|---|---|---|---|---|---|
| S1 | R1 | 7.81273 | d1 | 0.742 | nd1 | 1.4959 | v1 | 81.655 | 4.404 |
| S2 | R2 | 4.27534 | d2 | A |  |  |  |  | 3.939 |
| Stop |  | ∞ | D12 | d3 | −1.236 |  |  |  | 2.657 |
| S3 | R3 | 3.27848 | d4 | 2.318 | nd2 | 1.5438 | v2 | 56.029 | 2.663 |
| S4 | R4 | −8.84845 | d5 | 0.292 |  |  |  |  | 2.490 |
| S5 | R5 | 4.48611 | d6 | 0.405 | nd3 | 1.6153 | v3 | 25.936 | 2.129 |
| S6 | R6 | 2.29388 | d7 | 0.596 |  |  |  |  | 1.847 |
| S7 | R7 | −12.45891 | d8 | 0.361 | nd4 | 1.6700 | v4 | 19.392 | 1.836 |
| S8 | R8 | 6.64514 | d9 | B |  |  |  |  | 1.878 |
| S9 | R9 | 6.79743 | d10 | 0.803 | nd5 | 1.6153 | v5 | 25.936 | 2.029 |
| S10 | R10 | −8.18206 | d11 | C |  |  |  |  | 1.995 |
| S11 | R11 | 8.46501 | d12 | 0.400 | nd6 | 1.5346 | v6 | 55.695 | 2.633 |
| S12 | R12 | 4.97780 | d13 | 0.210 |  |  |  |  | 2.818 |
| S13 | R13 | ∞ | d14 | 0.210 | ndg | 1.5168 | vg | 64.167 | 2.873 |
| S14 | R14 | ∞ | d15 | D |  |  |  |  | 2.918 |

Reference wavelength = 587.6 nm

TABLE 14

|  | Imaging | | |
|---|---|---|---|
|  | Wide | Tele | Contracted |
| A | 10.147 | 1.436 | 1.436 |
| B | 0.273 | 0.828 | 0.200 |
| C | 3.860 | 1.547 | 0.270 |
| D | 1.040 | 6.193 | 0.890 |

TABLE 15

|  | Cone coefficient | Aspheric surface coefficient | | | |
|---|---|---|---|---|---|
|  | k | A4 | A6 | A8 | A10 |
| S1 | 0.0000E+00 | −5.7385E−03 | 3.6299E−04 | −2.0970E−05 | 1.3349E−06 |
| S2 | 0.0000E+00 | −8.2258E−03 | 6.3034E−04 | −9.4459E−05 | 1.2558E−05 |
| S3 | −3.7362E−01 | 7.4776E−04 | 5.9198E−04 | −4.1787E−04 | 1.7321E−04 |
| S4 | 0.0000E+00 | 1.2256E−02 | −2.4500E−03 | 5.9863E−04 | −1.3437E−04 |
| S5 | 0.0000E+00 | −3.8659E−02 | 3.8995E−03 | 1.7269E−03 | −9.8686E−04 |
| S6 | −5.6048E+00 | −5.8591E−03 | −1.4051E−02 | 1.3274E−02 | −6.2680E−03 |
| S7 | −5.0000E+01 | 7.0086E−03 | 3.1047E−03 | −2.8514E−03 | 1.8458E−03 |
| S8 | 0.0000E+00 | −3.2339E−03 | 2.8613E−02 | −2.4274E−02 | 1.2332E−02 |
| S9 | 0.0000E+00 | −6.4725E−03 | 1.7074E−02 | −1.3119E−02 | 5.7531E−03 |

TABLE 15-continued

| | | | | |
|---|---|---|---|---|
| S10 | 0.0000E+00 | 1.3225E-02 | -1.0171E-02 | 1.1465E-02 | -7.1844E-03 |
| S11 | -6.3466E+00 | -1.7153E-02 | 2.6433E-03 | -3.2400E-04 | 4.3365E-05 |
| S12 | -2.1190E+01 | -5.1779E-03 | -1.6955E-03 | 7.6430E-04 | -1.4174E-04 |

| | Cone coefficient | Aspheric surface coefficient | | |
|---|---|---|---|---|
| | k | A12 | A14 | A16 |
| S1 | 0.0000E+00 | -8.1503E-08 | 3.1114E-09 | -4.9180E-11 |
| S2 | 0.0000E+00 | -1.1269E-06 | 5.4030E-08 | -1.0782E-09 |
| S3 | -3.7362E-01 | -3.7552E-05 | 4.1525E-06 | -1.9096E-07 |
| S4 | 0.0000E+00 | 1.6965E-05 | -1.2495E-06 | 4.1593E-08 |
| S5 | 0.0000E+00 | 2.3274E-04 | -2.6947E-05 | 1.3007E-06 |
| S6 | -5.6048E+00 | 2.0450E-03 | -3.9314E-04 | 3.3783E-05 |
| S7 | -5.0000E+01 | -5.7675E-04 | 8.1320E-05 | -4.3265E-06 |
| S8 | 0.0000E+00 | -3.6625E-03 | 5.7130E-04 | -3.6576E-05 |
| S9 | 0.0000E+00 | -1.4046E-03 | 1.7690E-04 | -8.2968E-06 |
| S10 | 0.0000E+00 | 2.5340E-03 | -4.6865E-04 | 3.6007E-05 |
| S11 | -6.3466E+00 | -1.2835E-05 | 1.8482E-06 | -9.0136E-08 |
| S12 | -2.1190E+01 | 9.1737E-06 | 1.6138E-07 | -2.8105E-08 |

TABLE 16

| | Wide | Tele |
|---|---|---|
| Fno | 1.96 | 2.78 |
| 2ω (°) | 46.67 | 24.54 |
| f (mm) | 7.110 | 14.220 |

| | Wide | Tele | Contracted |
|---|---|---|---|
| TTL (mm) | 20.422 | 15.105 | 7.898 |
| LB (mm) | 1.460 | 6.613 | 1.310 |
| f1 (mm) | | -20.462 | |
| fG2 (mm) | | 15.801 | |
| f2 (mm) | | 4.716 | |
| f3 (mm) | | -8.207 | |
| f4 (mm) | | -6.419 | |
| f5 (mm) | | 6.160 | |
| f6 (mm) | | -23.544 | |
| IH (mm) | | 3.074 | |
| Zoom ratio | | 2.000 | |

As shown in the table 21, the embodiment 4 satisfies the conditions (1)~(8).

Figure 11:
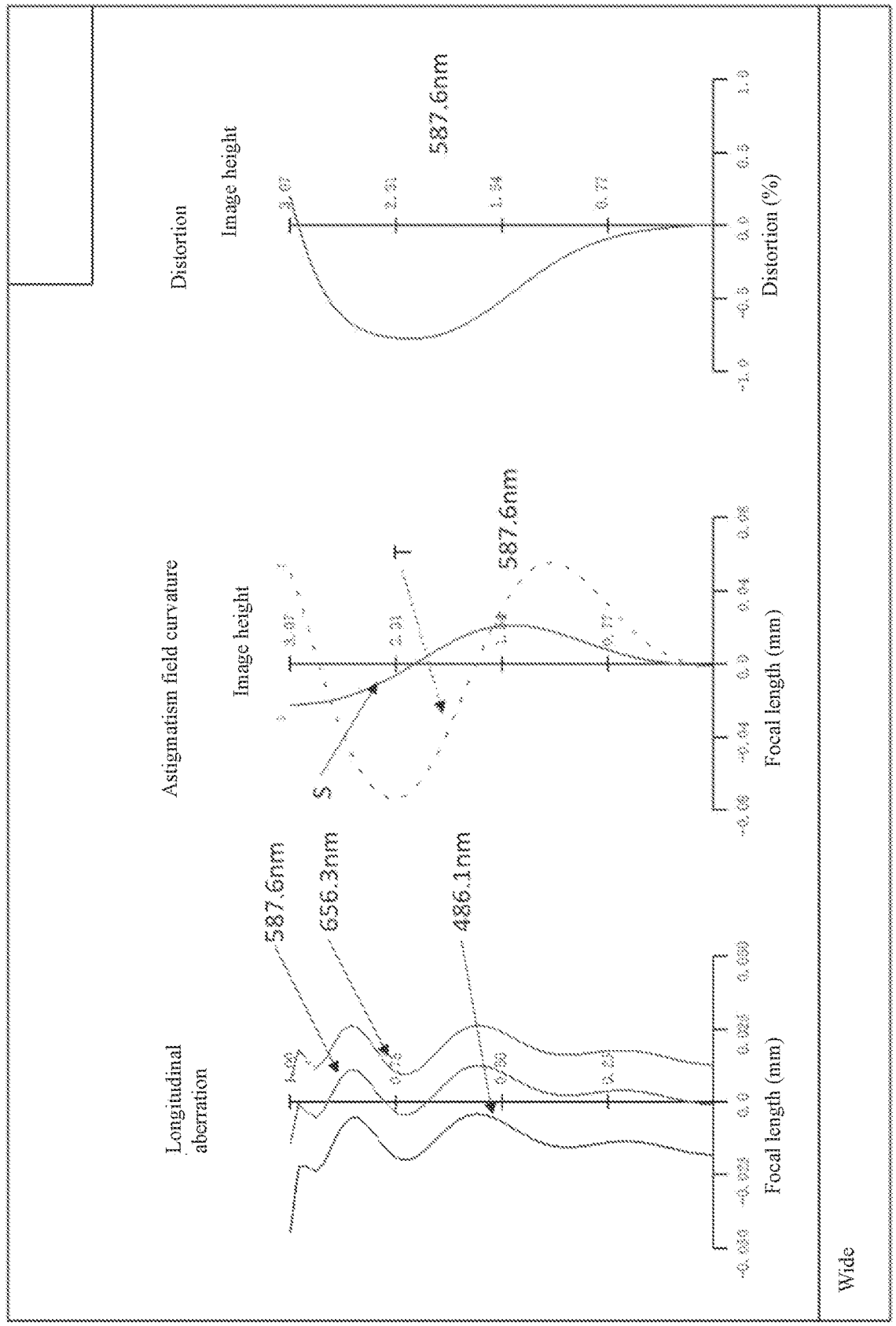
FIG. 11 is a schematic diagram of a longitudinal aberration, an astigmatism field curvature and a distortion of the zoom lens LA at a wide-angle end according to Embodiment 4 of the present invention.
Figure 12:
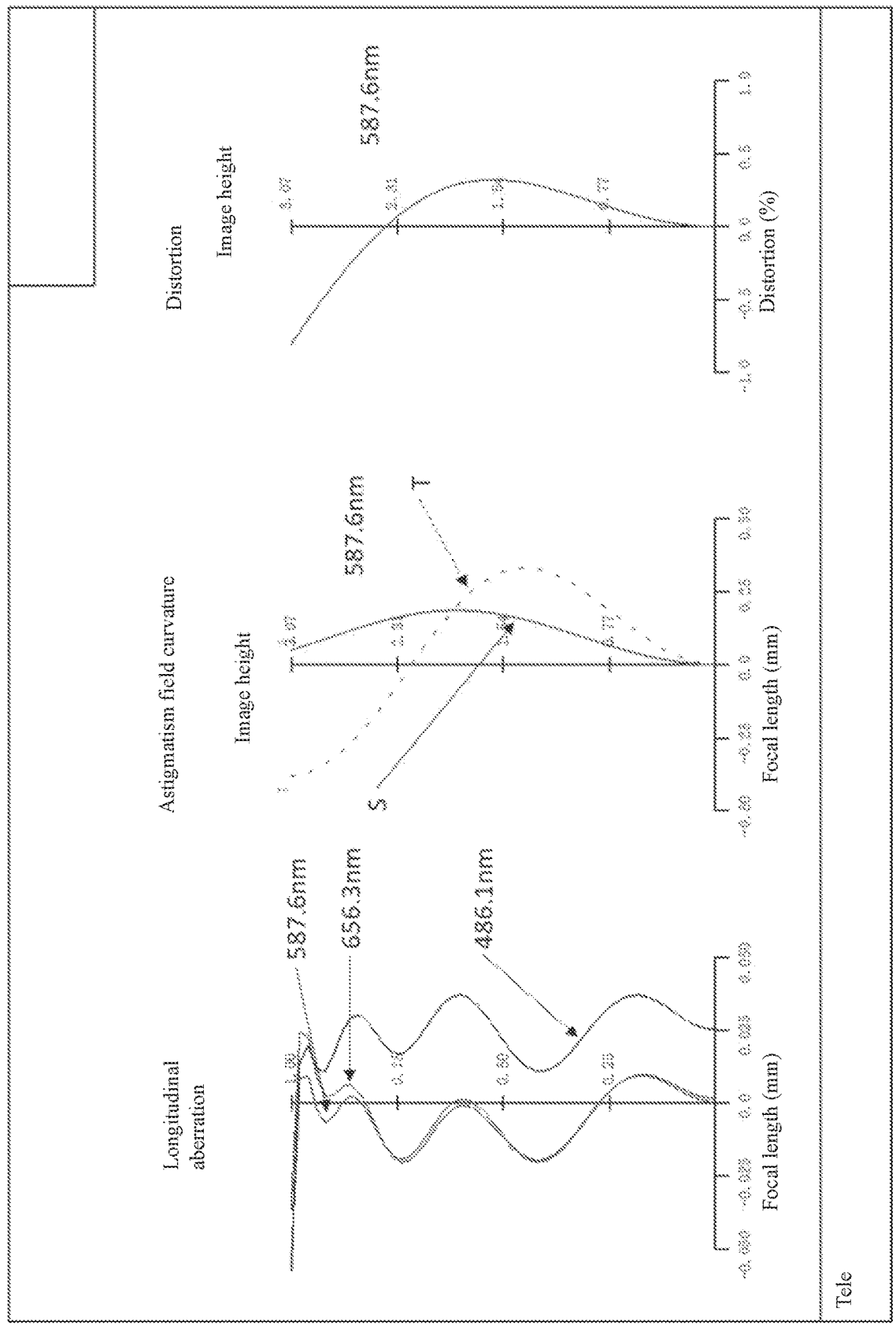
FIG. 12 is a schematic diagram of a longitudinal aberration, an astigmatism field curvature and a distortion of the zoom lens LA at a telephoto end according to Embodiment 4 of the present invention.

FIG. 11 illustrates an axial spherical aberration, an astigmatism field curvature, and a distortion of the zoom lens LA according to Embodiment 4 at the wide-angle end. FIG. 12 illustrates an axial spherical aberration, an astigmatism field curvature, and a distortion of the zoom lens LA according to Embodiment 4 at the telephoto end. It can be known that the zoom lens LA of the embodiment 4 becomes compact when TTL=7.898 in the contracted state, while the zoom lens becomes bright when FNO=1.96 at the wide-angle end, and the zoom ratio=2.000 and the zoom lens has good optical properties, as shown in FIG. 11 and FIG. 12.

Embodiment 5

Figure 13:
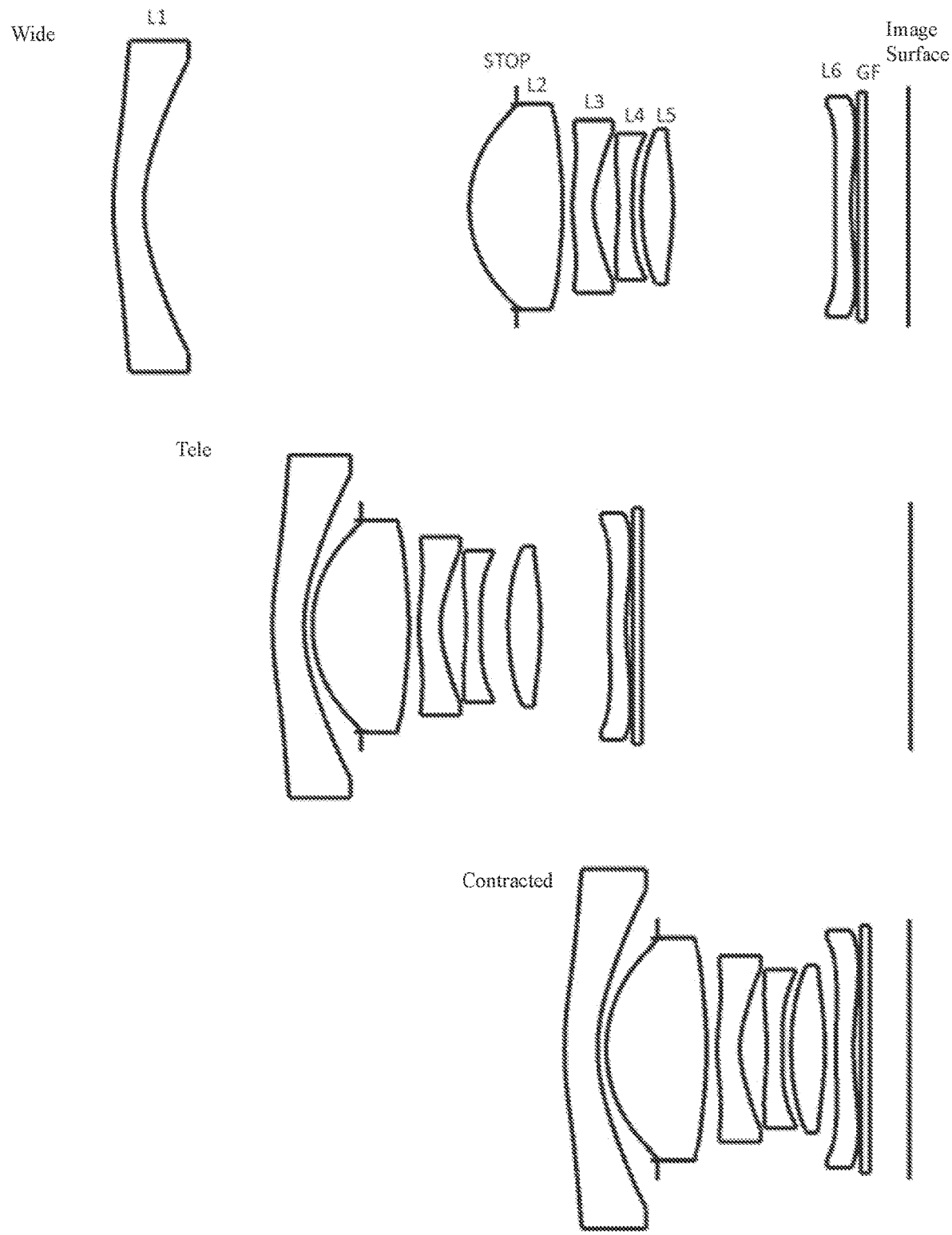
FIG. 13 is a schematic diagram of a general structure of a zoom lens LA according to Embodiment 5 of the present invention.

FIG. 13 is a schematic diagram of a zoom lens LA according to Embodiment 5 of the present invention. The curvature radiuses R of the image side surfaces and object side surfaces of the first lens L1 to the sixth lens L6 of the camera lens LA according to the Embodiment 4, the on-axis thicknesses of the lenses or on-axis distances d between the lenses, refractive indexes nd, abbe numbers vd are shown in Table 17. Values of A-D during imaging and in the contracted state are shown in Table 18; conic coefficients k and aspheric coefficients are shown in Table 19; and FNO, 2ω, f, TTL, LB, f1, fG2, f2, f3, f4, f5, f6, IH and zoom ratios are shown in Table 20.

TABLE 17

| | | R | | d | | nd | | vd | Effective radius (mm) |
|---|---|---|---|---|---|---|---|---|---|
| S1 | R1 | 7.70579 | d1 | 0.756 | nd1 | 1.4959 | v1 | 81.655 | 4.247 |
| S2 | R2 | 4.14214 | D12 d2 | A | | | | | 3.755 |
| Stop | | ∞ | d3 | -1.162 | | | | | 2.622 |
| S3 | R3 | 3.34187 | d4 | 2.301 | nd2 | 1.5438 | v2 | 56.029 | 2.631 |
| S4 | R4 | -8.40418 | d5 | 0.239 | | | | | 2.493 |
| S5 | R5 | 4.77669 | d6 | 0.517 | nd3 | 1.6153 | v3 | 25.936 | 2.206 |
| S6 | R6 | 2.22266 | d7 | 0.617 | | | | | 1.885 |
| S7 | R7 | -5.49224 | d8 | 0.350 | nd4 | 1.6700 | v4 | 19.392 | 1.862 |
| S8 | R8 | 35.94148 | d9 | B | | | | | 1.876 |
| S9 | R9 | 6.54571 | d10 | 0.774 | nd5 | 1.6153 | v5 | 25.936 | 1.957 |
| S10 | R10 | -7.56969 | d11 | C | | | | | 1.982 |
| S11 | R11 | 19.40691 | d12 | 0.400 | nd6 | 1.5346 | v6 | 55.695 | 2.600 |
| S12 | R12 | 7.02181 | d13 | 0.161 | | | | | 2.809 |
| S13 | R13 | ∞ | d14 | 0.210 | ndg | 1.5168 | vg | 64.167 | 2.882 |
| S14 | R14 | ∞ | d15 | D | | | | | 2.928 |

Reference wavelength = 587.6 nm

TABLE 18

| | Imaging | | |
|---|---|---|---|
| | Wide | Tele | Contracted |
| A | 9.208 | 1.362 | 1.362 |
| B | 0.218 | 0.659 | 0.200 |
| C | 4.000 | 1.641 | 0.250 |
| D | 1.040 | 6.424 | 0.890 |

TABLE 19

| | Cone coefficient | Aspheric surface coefficient | | | |
|---|---|---|---|---|---|
| | k | A4 | A6 | A8 | A10 |
| S1 | 0.0000E+00 | −6.3542E−03 | 4.0075E−04 | −2.2871E−05 | 1.4974E−06 |
| S2 | 0.0000E+00 | −8.9455E−03 | 6.2478E−04 | −8.8072E−05 | 1.1746E−05 |
| S3 | −3.3426E−01 | 1.1348E−03 | 6.3258E−04 | −4.4703E−04 | 1.7448E−04 |
| S4 | 0.0000E+00 | 1.1410E−02 | −2.4589E−03 | 5.8475E−04 | −1.3561E−04 |
| S5 | 0.0000E+00 | −4.3633E−02 | 4.5756E−03 | 1.6932E−03 | −9.9040E−04 |
| S6 | −3.7020E+00 | −3.0930E−02 | 1.4048E−03 | 5.4655E−03 | −2.6803E−03 |
| S7 | −5.0000E+01 | 1.2295E−02 | 3.0404E−03 | −2.8075E−03 | 1.7203E−03 |
| S8 | 0.0000E+00 | 4.2716E−02 | −1.1983E−02 | 4.6692E−03 | −1.2865E−03 |
| S9 | 0.0000E+00 | −2.3237E−03 | 5.0431E−03 | −3.8428E−03 | 1.9235E−03 |
| S10 | 0.0000E+00 | 4.4127E−03 | 1.9464E−03 | −1.2628E−03 | 5.6504E−04 |
| S11 | 4.6432E+01 | −1.2665E−02 | 2.1486E−03 | −5.2449E−04 | 1.0829E−04 |
| S12 | −3.1439E+01 | −5.6632E−03 | −3.7959E−04 | 2.6270E−04 | −6.1321E−05 |

| | Cone coefficient | Aspheric surface coefficient | | |
|---|---|---|---|---|
| | k | A12 | A14 | A16 |
| S1 | 0.0000E+00 | −8.5424E−08 | 2.9280E−09 | −4.2182E−11 |
| S2 | 0.0000E+00 | −1.0825E−06 | 5.3958E−08 | −1.1519E−09 |
| S3 | −3.3426E−01 | −3.7121E−05 | 4.1253E−06 | −1.9615E−07 |
| S4 | 0.0000E+00 | 1.7300E−05 | −1.1907E−06 | 3.4435E−08 |
| S5 | 0.0000E+00 | 2.3183E−04 | −2.6671E−05 | 1.2887E−06 |
| S6 | −3.7020E+00 | 8.3121E−04 | −1.6594E−04 | 1.4556E−05 |
| S7 | −5.0000E+01 | −5.7979E−04 | 8.1237E−05 | −4.3620E−06 |
| S8 | 0.0000E+00 | 1.4095E−04 | −3.8184E−06 | 1.7913E−07 |
| S9 | 0.0000E+00 | −5.5964E−04 | 8.6588E−05 | −5.2664E−06 |
| S10 | 0.0000E+00 | −1.4733E−04 | 1.8623E−05 | −5.2950E−07 |
| S11 | 4.6432E+01 | −1.9436E−05 | 1.9010E−06 | −7.8844E−08 |
| S12 | −3.1439E+01 | 6.4413E−06 | −3.7189E−07 | 1.0931E−08 |

TABLE 20

| | Wide | Tele |
|---|---|---|
| Fno | 1.95 | 2.81 |
| 2ω (°) | 47.29 | 24.66 |
| f (mm) | 7.110 | 14.220 |

| | Wide | Tele | Contracted |
|---|---|---|---|
| TTL (mm) | 19.627 | 15.249 | 7.864 |
| LB (mm) | 1.411 | 6.795 | 1.261 |
| f1 (mm) | | −19.426 | |
| fG2 (mm) | | 16.652 | |
| f2 (mm) | | 4.723 | |
| f3 (mm) | | −7.321 | |
| f4 (mm) | | −7.086 | |
| f5 (mm) | | 5.827 | |
| f6 (mm) | | −20.816 | |
| IH (mm) | | 3.074 | |
| Zoom ratio | | 2.000 | |

As shown in the table 21, the embodiment 5 satisfies the condition (1)~(8).

Figure 14:
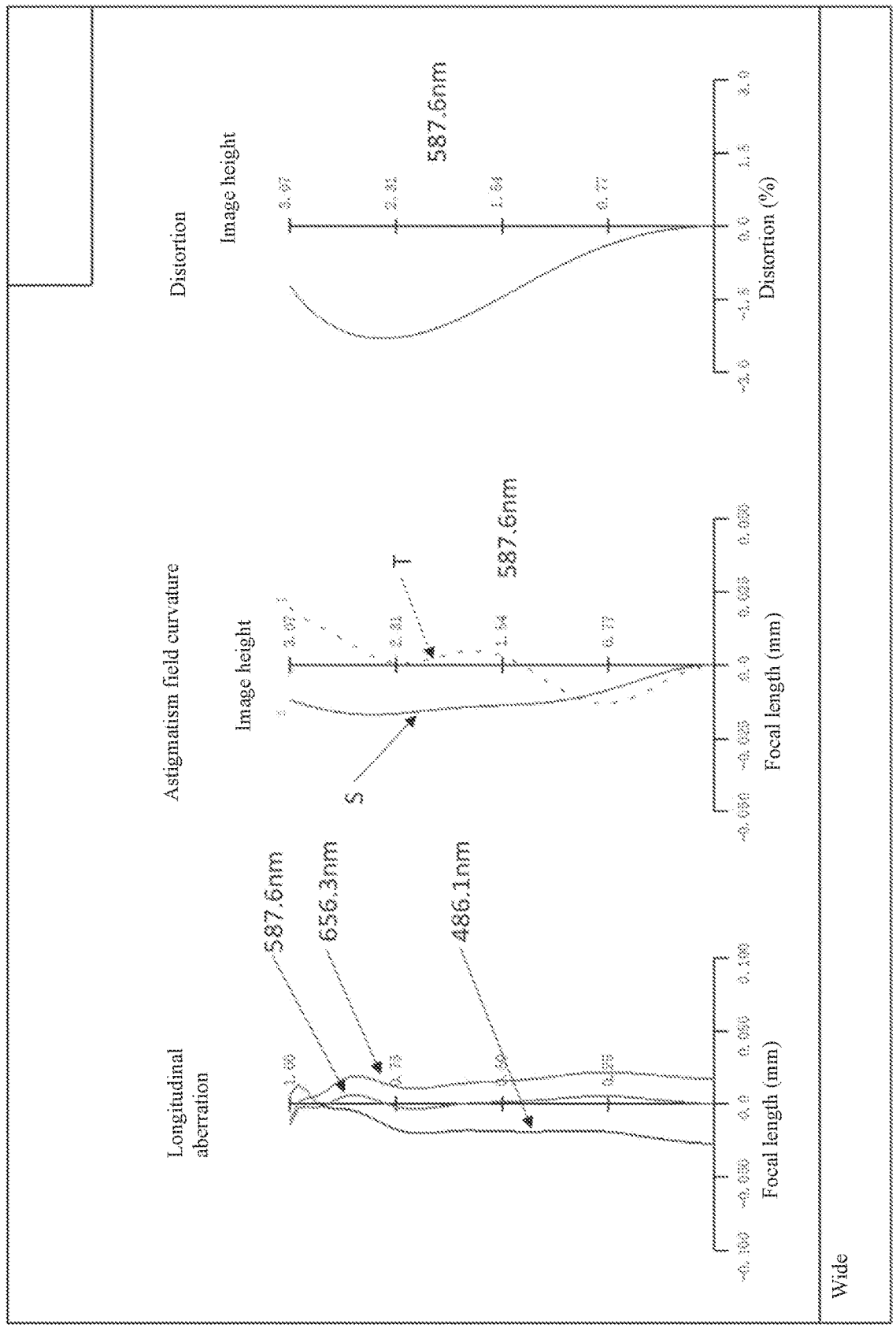
FIG. 14 is a schematic diagram of a longitudinal aberration, an astigmatism field curvature and a distortion of the zoom lens LA at a wide-angle end according to Embodiment 5 of the present invention.
Figure 15:
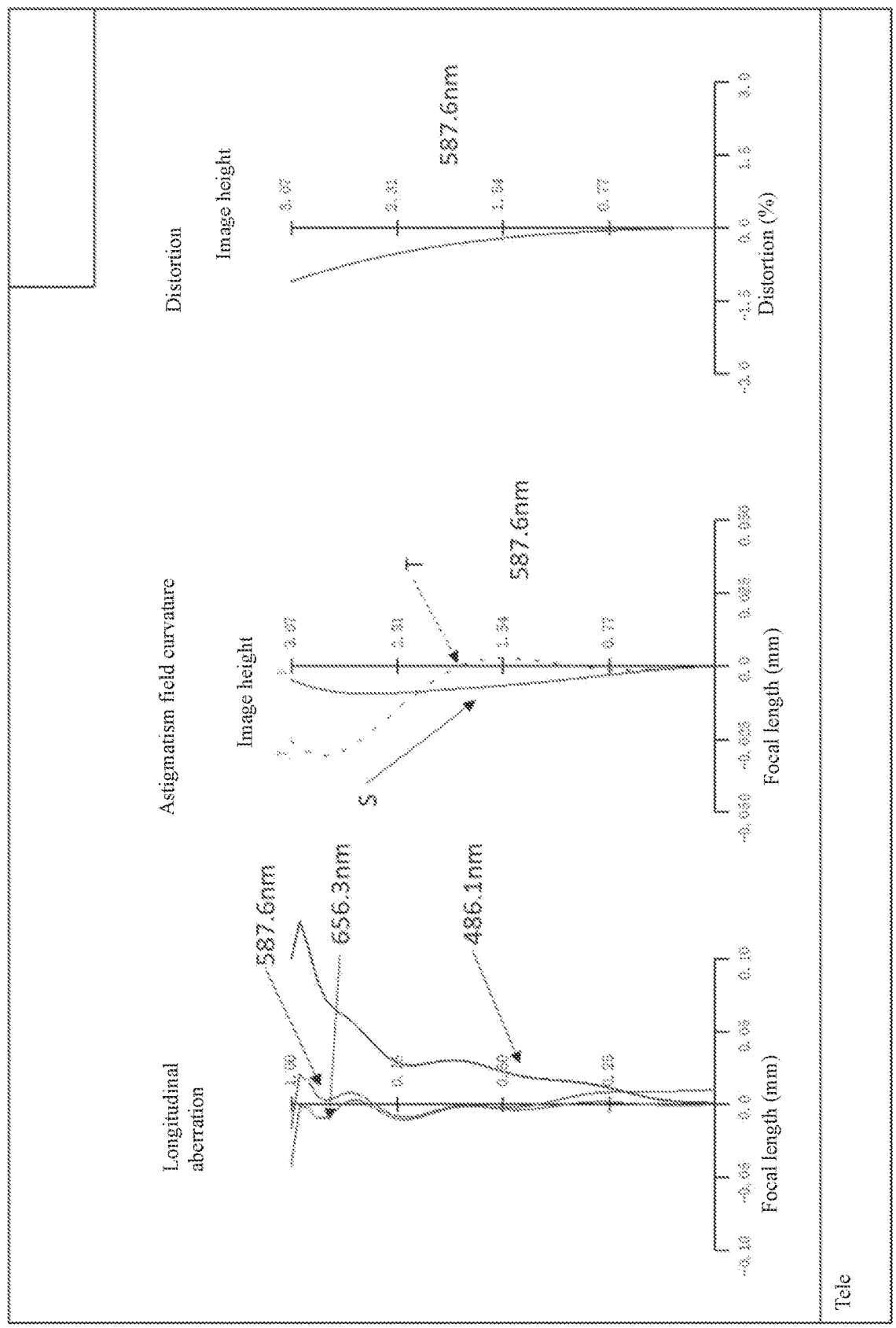
FIG. 15 is a schematic diagram of a longitudinal aberration, an astigmatism field curvature and a distortion of the zoom lens LA at a telephoto end according to Embodiment 5 of the present invention.

FIG. 14 illustrates an axial spherical aberration, an astigmatism field curvature, and a distortion of the zoom lens LA according to Embodiment 5 at the wide-angle end. FIG. 15 illustrates an axial spherical aberration, an astigmatism field curvature, and a distortion of the zoom lens LA according to Embodiment 5 at the telephoto end. It can be known that the zoom lens LA of the embodiment 5 becomes compact when TTL=7.864 in the contracted state, while the zoom lens becomes bright when FNO=1.95 at the wide-angle end, and the zoom ratio=2.000 and the zoom lens has good optical properties, as shown in FIG. 14 and FIG. 15.

The Table 21 shows the corresponding values of the parameters defined in the conditions (1) to (8) of Embodiments 1-5.

TABLE 21

|  | Embodiment 1 | Embodiment 2 | Embodiment 3 | Embodiment 4 | Embodiment 5 | Notes |
|---|---|---|---|---|---|---|
| f_Tele/f_Wide | 2.044 | 2.000 | 2.000 | 2.000 | 2.000 | Condition (1) |
| f3/f2 | −1.745 | −1.740 | −1.368 | −1.740 | −1.550 | Condition (3) |
| 2f4/f2 | −1.451 | −1.469 | −1.740 | −1.361 | −1.500 | Condition (3) |
| f1/fG2 | −1.238 | −1.248 | −1.080 | −1.295 | −1.167 | Condition (4) |
| f5/fG2 | 0.395 | 0.390 | 0.305 | 0.390 | 0.350 | Condition (5) |
| f6/fG2 | −1.495 | −1.330 | −1.101 | −1.490 | −1.250 | Condition (6) |
| LB_Tele/LB_Wide | 4.950 | 4.010 | 4.575 | 4.529 | 4.816 | Condition (7) |
| v1 | 76.860 | 81.655 | 81.655 | 81.655 | 81.655 | Condition (8) |

It can be appreciated by one having ordinary skills in the art that the description above is only embodiments of the present invention. In practice, the one having ordinary skills in the art can make various modifications to these embodiments in forms and details without departing from the scope of the present invention.

What is claimed is:

1. A zoom lens consists of, from an object side to an image side in sequence: a first lens having negative refractive power, a second lens group having positive refractive power, a fifth lens having positive refractive power, and a sixth lens having negative refractive power; wherein,
   among the first lens, the second lens group, the fifth lens, and the sixth lens, a distance between adjacent lenses or between lens and adjacent lens group in a direction of an optic axis varies during zooming;
   the second lens group consists of a second lens having positive refractive power, a third lens having negative refractive power, and a fourth lens having negative refractive power, and
   the zoom lens satisfies the following conditions:

$f\_Tele/f\_Wide \geq 1.80;$ $-1.75 \leq f3/f2 \leq -1.35;$ $-1.75 \leq f4/f2 \leq -1.35;$ where,
   f_Wide denotes a total optical length of the zoom lens at a wide-angle end;
   f_Tele denotes a total optical length of the zoom lens at a telephoto end;
   f2 denotes a focal length of the second lens;
   f3 denotes a focal length of the third lens; and
   f4 denotes a focal length of the fourth lens.

2. The zoom lens according to claim 1, wherein the zoom lens further satisfies a following condition:

$-1.30 \leq f1/fG2 \leq -1.00;$ where,
   f1 denotes a focal length of the first lens; and
   fG2 denotes a combined focal length of the second lens group.

3. The zoom lens according to claim 1, wherein the zoom lens further satisfies a following condition:

$0.30 \leq f5/fG2 \leq 0.40;$ where,
   f5 denotes a focal length of the fifth lens; and
   fG2 denotes a combined focal length of the second lens group.

4. The zoom lens according to claim 1, wherein the zoom lens further satisfies a following condition:

$-1.50 \leq f6/fG2 \leq -1.00;$ where,
   f6 denotes a focal length of the sixth lens; and
   fG2 denotes the combined focal length of the second lens group.

5. The zoom lens according to claim 1, wherein the zoom lens further satisfies a following condition:

$4.00 \leq LB\_Tele/LB\_Wide \leq 5.00;$ where,
   LB_Wide denotes an on-axis distance from an image side surface of the sixth lens to an image surface, at the wide-angle end; and
   LB_Tele denotes the on-axis distance from the image side surface of the sixth lens to the image surface, at the telephoto end.

6. The zoom lens according to claim 1, wherein the zoom lens further satisfies a following condition:

$76.00 \leq v1 \leq 82.00,$ where, v1 denotes an Abbe number of the first lens.

7. The zoom lens according to claim 1, wherein the first lens is a glass lens.

* * * * *